United States Patent
Ström et al.

(10) Patent No.: US 12,200,206 B2
(45) Date of Patent: Jan. 14, 2025

(54) LOW COMPLEXITY IMAGE FILTER

(71) Applicant: Telefonaktiebolaget LM Ericsson (publ), Stockholm (SE)

(72) Inventors: Jacob Ström, Stockholm (SE); Zhi Zhang, Solna (SE); Kenneth Andersson, Gävle (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/784,961

(22) PCT Filed: Dec. 16, 2020

(86) PCT No.: PCT/SE2020/051221
§ 371 (c)(1),
(2) Date: Jun. 13, 2022

(87) PCT Pub. No.: WO2021/126061
PCT Pub. Date: Jun. 24, 2021

(65) Prior Publication Data
US 2023/0023387 A1    Jan. 26, 2023

Related U.S. Application Data

(60) Provisional application No. 62/949,204, filed on Dec. 17, 2019.

(51) Int. Cl.
*H04N 19/117*    (2014.01)
*H04N 19/176*    (2014.01)
(Continued)

(52) U.S. Cl.
CPC ......... *H04N 19/117* (2014.11); *H04N 19/176* (2014.11); *H04N 19/186* (2014.11); *H04N 19/82* (2014.11)

(58) Field of Classification Search
None
See application file for complete search history.

(56) References Cited

U.S. PATENT DOCUMENTS

| 2012/0183081 A1 | 7/2012 | Lui et al. |
| 2016/0173881 A1 | 6/2016 | Alshina et al. |

(Continued)

FOREIGN PATENT DOCUMENTS

| CN | 109691102 A | 4/2019 |
| EP | 1626499 A1 | 2/2006 |

(Continued)

OTHER PUBLICATIONS

Misra, Kiran et al. "CE5-Related: Reducing multiplier count in CCALF". JVET-P0468 [date of search: Sep. 27, 2023], Sep. 25, 2019, jvet-experts.org/doc_end_user/documents/16_Geneva/wg11/JVET-P0468-v1.zip, Joint Video Experts Team (JVET) of ITU-T SG 16 WP3 and ISO/IEC JTC 1/SC 29/WG11, 16th meeting: Geneva, CH, Oct. 1-11, 2019, 6 pages.

(Continued)

*Primary Examiner* — Lindsay J Uhl
(74) *Attorney, Agent, or Firm* — Rothwell, Figg, Ernst & Manbeck, P.C.

(57) ABSTRACT

There is provided a method for encoding or decoding an image. The method comprises obtaining a first luma sample value, L1, associated with the image. The method comprises obtaining a second luma sample value, L2, associated with the image. The method further comprises obtaining a first luma delta value, $\Delta L1$, wherein $\Delta L1 = L2 - L1$. The method comprises obtaining a first product, P1, using $\Delta L1$ and a first coefficient value, C1, wherein $P1 = (C1)(\Delta L1)$. The method comprises calculating a first residual correction value, $\Delta I1$ using P1 and a set of other products. The method comprises filtering an unfiltered chroma value, $R_C$, associated with the image using the first residual correction value, $\Delta I1$, thereby (Continued)

producing a filtered chroma value $R^F_C$ associated with the image.

20 Claims, 15 Drawing Sheets

(51) Int. Cl.
  *H04N 19/186* (2014.01)
  *H04N 19/82* (2014.01)

(56) References Cited

U.S. PATENT DOCUMENTS

| | | |
|---|---|---|
| 2017/0034525 A1 | 2/2017 | Sato |
| 2019/0116361 A1 | 4/2019 | Rusanovskyy et al. |
| 2019/0215517 A1 | 7/2019 | Ramasubramonian et al. |
| 2019/0373291 A1 | 12/2019 | Francois et al. |
| 2020/0413082 A1 | 12/2020 | Li et al. |
| 2021/0160513 A1* | 5/2021 | Hu .................. H04N 19/82 |
| 2022/0312006 A1 | 9/2022 | Taquet et al. |
| 2023/0024020 A1 | 1/2023 | Ström et al. |

FOREIGN PATENT DOCUMENTS

| | | |
|---|---|---|
| JP | 2022-554308 A | 12/2022 |
| WO | 2015/191834 A1 | 12/2015 |
| WO | 2017/093189 A1 | 6/2017 |
| WO | 2017/143211 A1 | 8/2017 |
| WO | 2019026807 A1 | 2/2019 |
| WO | 2019170259 A1 | 9/2019 |
| WO | 2019/189344 A1 | 10/2019 |
| WO | 2020126411 A1 | 6/2020 |
| WO | 2021/083258 A1 | 5/2021 |
| WO | 2021/101892 A1 | 5/2021 |

OTHER PUBLICATIONS

Yao, J. et al., "Non-CES: Non-Linear Cross Component Adaptive Loop Filter", Document: JVET-Q0304-v1, Joint Video Experts Team (JVET) of ITU-T SG 16 WP 3 and ISO/IEC JTC 1/SC 29/WG 11, 17th Meeting: Brussels, BE, Jan. 7-17, 2020 (5 pages).
Bross, B. et al., "Versatile Video Coding (Draft 7)", Document: JVET-P2001-vE, Joint Video Experts Team (JVET) of ITU-T SG 16 WP 3 and ISO/IEC JTC 1/SC 29/WG 11, 16th Meeting: Geneva, CH, Oct. 1-11, 2019 (494 pages).
International Search Report and Written Opinion dated Feb. 12, 2021 in International Application No. PCT/SE2020/051221 (14 pages).
Misra, K. et al., "CE5-Related: Reducing multiplier count in CCALF", Document: JVET-P0468-v3, Joint Video Experts Team (JVET) of ITU-T SG 16 WP 3 and ISO/IEC JTC 1/SC 29/WG 11, 16th Meeting: Geneva, CH, Oct. 1-11, 2019 (5 pages).
Zhang, Z. et al., "CE5-related: On the CC-ALF filtering process", Document: JVET-Q0165-v1, Joint Video Experts Team (JVET) of ITU-T SG 16 WP 3 and ISO/IEC JTC 1/SC 29/WG 11, 17th Meeting: Brussels, BE, Jan. 7-17, 2020 (7 pages).
Misra, K., et al., "Cross-Component Adaptive Loop Filter for chroma," Document: JVET-O0636_r1, Joint Video Experts Team (JVET) of ITU-T SG 16 WP 3 and ISO/IEC JTC 1/SC 29/WG 11, 15th Meeting: Gothenburg, SE, Jul. 3-12, 2019 (25 pages).
Chen, C., et al., "Description of Core Experiment 5 (CE5): Cross Component Adaptative Loop Filtering," Document: JVET-P2025-v4, Joint Video Experts Team (JVET) of ITU-T SG 16 WP 3 and ISO/IEC JTC 1/SC 29/WG 11, 16th Meeting: Geneva, CH, Oct. 1-11, 2019 (7 pages).
Bross, B., et al., "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019 (461 pages).
Bross, B., et al., "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019 (455 pages).
Misra, K., et al., "Cross-Component Adaptive Loop Filter for chroma," Document: JVET-O0636_r1, Joint Video Experts Team (JVET) of ITU-T SG 16 WP 3 and ISO/IEC JTC 1/SC 29/WG 11, 15th Meeting: Gothenburg, SE, Jul. 3-12, 2019 (9 pages).
Misra, K., et al., "CE5-related: On the design of CC-ALF", Document: JVET-P1008-v2, Joint Video Experts Team (JVET) of ITU-T SG 16 WP 3 and ISO/IEC JTC 1/SC 29/WG 11, 16th Meeting: Geneva, CH, Oct. 1-11, 2019 (6 pages).
Li, T. et al., "Crosscheck of JVET-P0561 (AHG16: Context restriction on CTU boundary for line buffer reduction)", Document: JVET-P0636-v2, Joint Video Experts Team (JVET) of ITU-T SG 16 WP 3 and ISO/IEC JTC 1/SC 29/WG 11, 16th Meeting: Geneva, CH, Oct. 11, 2019 (4 pages).
Response to Non-Final Office Action filed Jul. 22, 2024 in related U.S. Appl. No. 17/783,132 (8 pages).
Non-Final Office Action dated Apr. 23, 2024 in related U.S. Appl. No. 17/783,132 (16 pages).
Hu, N et al., "CE5-related: Multiplication removal for cross component adaptive loop filter", Joint Video Experts Team (JVET) of ITU-T SG 16 WP 3 and ISO/IEC JTC 1/SC 29/WG 11, Document: JVET-P0557, 16th Meeting: Geneva, CH, Oct. 1-11, 2019 (5 pages).
Taquet, J. et al., "Non-CE5: CC-ALF filtering simplification", Joint Video Experts Team (JVET) of ITU-T SG 16 WP 3 and ISO/IEC JTC 1/SC 29/WG 11, Document: JVET-P0330, 16th Meeting: Geneva, CH, Oct. 1-11, 2019 (8 pages).
Zhao, Y. et al., "CE5-related: Simplified CCALF with 6 filter coefficients", Joint Video Experts Team (JVET) of ITU-T SG 16 WP 3 and ISO/IEC JTC 1/SC 29/WG 11, Document: JVET-P0251-v4, 16th Meeting: Geneva, CH, Oct. 1-11, 2019 (11 pages).
Ström, J. et al., "Non-CE5: Multiplication simplification for ALF and CC-ALF", Joint Video Experts Team (JVET) of ITU- T SG 16 WP 3 and ISO/IEC JTC 1/SC 29/WG 11, Document: JVET-Q0167_v2, 17th Meeting: Brussels, BE, Jan. 7-17, 2020 (12 pages).
Final Office Action dated Oct. 16, 2024 in related U.S. Appl. No. 17/783,132 (17 pages).

\* cited by examiner

LOW COMPLEXITY IMAGE FILTER

CROSS REFERENCE TO RELATED APPLICATION(S)

This application is a 35 U.S.C. § 371 National Stage of International Patent Application No. PCT/SE2020/051221, filed Dec. 16, 2020, designating the United States and claiming priority to U.S. provisional application no. 62/949,204, filed on Dec. 17, 2019. The above-identified applications are incorporated by reference.

TECHNICAL FIELD

This disclosure relates to the encoding and/or decoding of an image or a video sequence.

INTRODUCTION

A video sequence consists of several images. When viewed on a screen, the image consists of pixels, each pixel having a red, green and blue (RGB) value. However, when encoding and decoding a video sequence, the image is often not represented using RGB values but typically using another color space, including but not limited to YCbCr, $IC_TC_P$, non-constant-luminance YCbCr, and constant luminance YCbCr. If we take the example of YCbCr, it is made up of three components: luma (Y) which roughly represents luminance, and chroma (Cb, and Cr), both of which represents chrominance. It is often the case that Y is of full resolution, whereas the two other components, Cb and Cr, are of a smaller resolution. A typical example is a high definition (HD) video sequence containing 1920×1080 RGB pixels, which is often represented with a 1920×1080-resolution Y component, a 960×540 Cb component and a 960×540 Cr component. The elements in the components are called samples. In the example given above, there are therefore 1920×1080 samples in the Y component, and hence a direct relationship between samples and pixels. Therefore, in this document, we sometimes use the term pixels and samples interchangeably. For the Cb and Cr components, there is no direct relationship between samples and pixels; a single Cb sample typically influences several pixels.

In the draft for the Versatile Video Coding (VVC) standard that is developed by the Joint Video Experts Team (JVET), the decoding of an image can be thought of as carried out in two stages; prediction decoding and loop filtering. In the prediction decoding stage, the samples of the components (Y, Cb and Cr) are partitioned into rectangular blocks. As an example, one block may be of size 4×8 samples, whereas another block may be of size 64×64 samples. The decoder obtains instructions for how to do a prediction for each block, for instance to copy samples from a previously decoded image (an example of temporal prediction), or copy samples from already decoded parts of the current image (an example of intra prediction), or a combination thereof. To improve this prediction, the decoder may obtain a residual, often encoded using transform coding such as discrete sine or cosine transforms DST/DCT. This residual is added to the prediction, and the decoder can proceed to decode the subsequent block.

The output from the prediction decoding stage is the three components Y, Cb and Cr. However, it is possible to further improve the fidelity of these components, and this is done in the loop filtering stage. The loop filtering stage in the current draft of VVC consists of four sub-stages; a LMCS stage, a deblocking filter stage, a sample adaptive offset filter (SAO) sub-stage, and an adaptive loop filter (ALF) sub-stage. Each stage is optional for the encoder to use but the decoder must support them. In the LMCS stage an inverse mapping of luma values is made if the coding was done on mapped luma values. Mapping of luma values is a way to make use of a larger range of code values than present in the source which may have a limited range of luma values. In the deblocking filter sub-stage, the decoder changes Y, Cb and Cr by smoothing edges near block boundaries when certain conditions are met. This increases perceptual quality (subjective quality) since the human visual system is very good at detecting regular edges such as block artifacts along block boundaries. In the SAO sub-stage, the decoder adds or subtracts a signaled value to samples that meet certain conditions, such as being in a certain value range (band offset SAO) or having a specific neighborhood (edge offset SAO). This can reduce ringing noise since such noise often aggregate in certain value range or in specific neighborhoods (e.g., in local maxima). In this document we will denote the reconstructed image component that are the result of this stage $Y_{SAO}$, $Cb_{SAO}$, $Cr_{SAO}$.

The basic idea behind adaptive loop filtering is that the fidelity of the image components $Y_{SAO}$ $Cb_{SAO}$ and $Cr_{SAO}$ can often be improved by filtering the image using a linear filter that is signaled from the encoder to the decoder. As an example, by solving a least-squares problem, the encoder can determine what coefficients a linear filter should have in order to most efficiently lower the error between the reconstructed image components so far, $Y_{SAO}$, $Cb_{SAO}$, $Cr_{SAO}$, and the original image components $Y_{org}$, $Cb_{org}$ and $Cr_{org}$. These coefficients can then be signaled from the encoder to the decoder. The decoder reconstructs the image as described above to get $Y_{SAO}$, $Cb_{SAO}$, and $Cr_{SAO}$, obtains the filter coefficients from the bit stream and then applies the filter to get the final output, which we will denote $Y_{ALF}$, $Cb_{ALF}$, $Cr_{ALF}$. In VVC, the ALF is more advanced than this. To start with, it is observed that it is often advantageous to filter some samples with one set of coefficients, but avoid filtering other samples, or perhaps filter those other samples with another set of coefficients. To that end, VVC classifies every Y sample (i.e., every luma sample) into one of 25 classes. Which class a sample belongs to is decided based on the local neighborhood of that sample, specifically on the gradients of surrounding samples and the activity of surrounding samples. It is possible for the encoder to signal one set of coefficients for each of the 25 classes. The decoder will then first decide which class a sample belongs to, and then select the appropriate set of coefficients to filter the sample. However, signaling 25 sets of coefficients can be costly. Hence the VVC standard also allows that only a few of the 25 classes are filtered using unique sets of coefficients. The remaining classes may reuse a set of coefficients used in another class, or it may be determined that it should not be filtered at all. Another way to reduce cost is to use what is called the fixed coefficient set. This is a set of 64 hard-coded filters (i.e., 64 groups of coefficient values) that are known to the decoder. It is possible for the encoder to signal the use of one of these fixed (i.e., hard-coded) filters to the decoder very inexpensively, since they are already known to the decoder. For example, the decoder stores a set of 16 different groups of N index values (e.g., N=25) and the encoder transmits an initial index value that points to one of the 16 groups of N index values, where each one of the index values included in the group of N index values is associated with a class and each one of the index values points to one of the 64 hard-coded filters. For example, the first of the N values in the group of index values points to the fixed filter that should be used for the first class, the second value points to the fixed filter that should be used for the second class, etc. Accordingly, the decoder obtains an index value for a particular filter based on the initial index value and the class. Although these filters are cheap, they may not match the desired filter perfectly and thus result in slightly worse quality. For samples belonging to Cb or Cr, i.e., for chroma samples, no classification is used and the same set of coefficients is used for all samples.

Transmitting the filter coefficients is costly, and therefore the same coefficient value is used for two filter positions. For luma (samples in the Y-component), the coefficients are re-used in the way shown in FIG. 1.

Assume R(x,y) is the sample to be filtered, situated in the middle of FIG. 1. Then samples R(x,y−1) (the sample exactly above) and the sample R(x,y+1) (the sample exactly below) will be treated with the same coefficient C6.

The filtered version of the sample in position (x,y), which we will denote $R_F(x,y)$, is calculated with the help of the variable sum which is in turn calculated as shown below:

$$\begin{aligned}\text{Sum} = &\ C0 * [\text{clip}(s0, R(x, y-3) - R(x, y)) + \\ &\ \text{clip}(s0, R(x, y+3) - R(x, y))] + \\ &\ C1 * [\text{clip}(s1, R(x-1, y-2) - R(x, y)) + \\ &\ \text{clip}(s1, R(x+1, y+2) - R(x, y))] + \\ &\ C2 * [\text{clip}(s2, R(x, y-2) - R(x, y)) + \\ &\ \text{clip}(s2, R(x, y-2) - R(x, y))] + \\ &\ C3 * [\text{clip}(s3, R(x+1, y+2) - R(x, y)) + \\ &\ \text{clip}(s3, R(x-1, y-2) - R(x, y))] + \\ &\ C4 * [\text{clip}(s4, R(x-2, y-1) - R(x, y)) + \\ &\ \text{clip}(s4, R(x+2, y+1) - R(x, y))] + \\ &\ C5 * [\text{clip}(s5, R(x-1, y-1) - R(x, y)) + \\ &\ \text{clip}(s5, R(x+1, y+1) - R(x, y))] \\ &\ C6 * [\text{clip}(s6, R(x, y-1) - R(x, y)) + \\ &\ \text{clip}(s6, R(x, y+1) - R(x, y))] + \\ &\ C7 * [\text{clip}(s7, R(x+1, y-1) - R(x, y)) + \\ &\ \text{clip}(s7, R(x-1, y+1) - R(x, y))] + \\ &\ C8 * [\text{clip}(s8, R(x+2, y-1) - R(x, y)) + \\ &\ \text{clip}(s8, R(x-2, y+1) - R(x, y))] + \\ &\ C9 * [\text{clip}(s9, R(x-3, y) - R(x, y)) + \\ &\ \text{clip}(s9, R(x+3, y) - R(x, y))] + \\ &\ C10 * [\text{clip}(s10, R(x-2, y) - R(x, y)) + \\ &\ \text{clip}(s10, R(x+2, y) - R(x, y))] + \\ &\ C11 * [\text{clip}(s11, R(x-1, y) - R(x, y)) + \\ &\ \text{clip}(s11, R(x+1, y) - R(x, y))]. \end{aligned}$$ (Eqn 1)

Here the clip(m,x) operation simply makes sure that the magnitude of the value x never exceeds m:

$$\text{clip}(m, x) = \begin{cases} \min(x, m) & \text{if } x \geq 0 \\ \max(x, -m) & \text{if } x < 0 \end{cases}$$ (Eqn 2)

The filtered value $R_F(x,y)$ is finally calculated as $$R_F(x,y) = R(x,y) + ((\text{sum} + 64) >> 7)$$ (Eqn 3)

The magnitudes s0 through s11 are also be signaled from the encoder to the decoder. Note that coefficient C12 is not used in Equation 1 since the value clip (s12,R(x,y)−R(x,y)) is always zero.

In JVET-O0636 reference [1], a tool called the Cross-Component Adaptive Loop Filter (CC-ALF) was first proposed as part of the adaptive loop filter process. The CC-ALF was studied in a Core Experiment in JVET-P meeting and JVET-Q meeting. The CC-ALF makes use of luma sample values to refine each chroma component. The luma sample values that are used are the reconstructed luma samples after SAO and before luma ALF operations, i.e., $Y_{SAO}$ as described above. A linear, diamond-shaped filter is applied to the luma samples for each chroma component i to derive a residual correction $\Delta I_i(x,y)$. The residual correction is applied to the reconstructed chroma sample after the ALF-chroma operation to derive the reconstructed chroma sample value. FIG. 2 illustrates the placement of CC-ALF with respect to the other loop filters.

In JVET-P2025 [ref 2], "Description of Core experiment 5 (CE5): Cross component Adaptive Loop filtering", an anchor for CC-ALF (named "CE anchor" in the following of the current invention) is specified for use in core experiment tests. The CE anchor has the following seven properties: 1) Filter shape is a 3×4 diamond with 8 unique coefficients; 2) Filter coefficient dynamic range is between [−32, 31], inclusive; 3) Filter coefficients bit scale is equal to 7; 4) Filter selection is performed at the CTU level with support for a maximum of 4 filters; 5) Symmetric line selection is used at virtual boundaries; 6) Temporal layer coefficient buffers are not used; 7) Residual correction is clipped to $-2^{BitDepthC-1}$ to $2^{BitDepthC-1}-1$, inclusive.

The CE anchor applies an 8-tap diamond CC-ALF filter to the co-located luma samples centered at the chroma sample to be refined. FIG. 3 shows the CE anchor CC-ALF filter shape for 4:2:0 color format with one type of chroma location where chroma is aligned horizontally but in-between luma samples vertically as in ITU-T Rec 709. An example of another chroma location type is to have the chroma aligned with luma as in ITU-T BT.2100.

Assume the $R_C(x_C, y_C)$ is the ALF chroma reconstructed chroma sample to be refined by CC-ALF, where the $(x_C, y_C)$ specifies the position of the chroma sample in the current picture. The co-located luma sample to the $R_C(x_C, y_C)$ is $R_L(x_L, y_L)$, where $(x_L, y_L)$ specifies the position of the co-located luma sample in the current picture. As is seen in FIG. 3, in some circumstances the chroma sample location may not be in the same position as any luma sample, but can be, for instance, between two luma samples. In those cases it must be defined what we mean by the collocated luma sample. In the case of FIG. 3, the upper of the two closest luma samples is defined to be the collocated luma sample, as is also shown in FIG. 4. The 8 luma samples to be filtered by CC-ALF are $R_L(x_L-1, y_L)$, $R_L(x_L, y_L-1)$, $R_L(x_L, y_L)$, $R_L(x_L-1, y_L+1)$, $R_L(x_L+1, y_L-1)$, $R_L(x_L+1, y_L)$, $R_L(x_L+1, y_L+1)$, $R_L(x_L+2, y_L)$. FIG. 4 shows the 8-tap 3×4 diamond CC-ALF filter coefficient respect to the luma sample location.

The residual correction $\Delta I_i(x,y)$ is calculated in the following way:

$$\Delta I_i(x, y) = (C_L0 * R_L(x_L, y_L - 1) + \quad \text{(Eqn 4)}$$

$$C_L1 * R_L(x_L - 1, y_L) +$$

$$C_L2 * R_L(x_L, y_L) +$$

$$C_L3 * R_L(x_L + 1, y_L) +$$

$$C_L4 * R_L(x_L - 1, y_L + 1) +$$

$$C_L5 * R_L(x_L, y_L + 1) +$$

$$C_L6 * R_L(x_L + 1, y_L + 1) +$$

$$C_L7 * R_L(x_L, y_L + 2) + 2^{shiftFactor-1}) \gg shiftFactor$$

where $C_Li$ specifies the CC-ALF filter coefficients, i ranges from 0 to 7, each coefficient but $C_L2$ is estimated in the encoder side; each CC-ALF filter coefficient $C_Li$ has a value ranges of [−32, 31], inclusive (this value range is also referred to as the dynamic range); $C_L2$ is calculated as $C_L2=(-1)*(C_L0+C_L1+C_L3+C_L4+C_L5+C_L6+C_L7)$ and then clipped to the value range [−32, 31], inclusive; and shiftFactor=coefficient bit scale+(BitDepth$_Y$−BitDepth$_C$), where in CE anchor, coefficient bit scale is equal to 7.

The residual correction $\Delta I_i(x,y)$ is clipped to a value range between $[-2^{BitDepthC-1}, 2^{BitDepthC-1}-1]$, inclusive. The CC-ALF refined chroma sample $R^F(x_C, y_C)$ is then derived as: $R_C^F(x_C, y_C)=\Delta I_i(x,y)+R_C(x_C, y_C)$, and then it is clipped to the range $[0, 2^{BitDepthC}-1]$, inclusive.

Each CC-ALF filter coefficient is coded with a 6-bit long fix length code which can represent a value from 0 to 63. The encoded/decoded CC-ALF coefficients are named $D_L(i)$, where i ranges from 0, 1, 2 to 7. The CC-ALF coefficient $C_L(i)$ is equal to $D_L(i)$−32.

In the CE description document JVET-P2025, there are two tests to remove the multiplication in the CC-ALF filter process. In the document, these tests are referred to as CE5-2.1 and CE5-2.2. Multiplications are costly in terms of surface area and/or power consumption when implementing a video encoder or a video decoder in hardware. Therefore, removing the multiplication operation results in a complexity reduction for the CC-ALF filtering process. One CE test, CE5-2.1, restricts the CC-ALF filter coefficients to have values from the set {−64, −32, −16, −8, −4, −2, −1, 0, 1, 2, 4, 8, 16, 32, 64}. Another CE test, CE5−2.2, restricts the CC-ALF filter coefficients to have values from the set {−8, −4, −2, −1, 0, 1, 2, 4, 8}. Since all these coefficient values can be written as $(\pm)2^N$, the multiplication operations in CC-ALF filtering process can be replaced by shift operation and a sign change, which is much cheaper in term of hardware design. For example, $(M*2^N)$ is equivalent to (M<<N), where the operator<<denotes arithmetic left shift. In the following of this proposed invention, we name a set $Z_{two}$, where each value from the set $Z_{two}$ can be written as either 0 or $\pm 2^N$.

SUMMARY

Certain challenges exist. For example, while the CE tests of multiplication removal reduce hardware complexity for the CC-ALF filtering process, restricting the CC-ALF coefficient value to be either 0 or pure power-of-two (e.g., +/−0, 1, 2, 4, 8, 16, 32, 64, 128) may reduce the CC-ALF filtering precision. This means that the coding efficiency in terms of BD-rate can go down substantially.

Here we give one example of the BD-rate results from CE test CE5-2.2, which restricts the CC-ALF filter coefficient to have values {−8, −4, −2, −1, 0, 1, 2, 4, 8}. Compared to the CE anchor, the BD-rate numbers are as shown in Table 1 below:

TABLE 1

| BDR results for CE5-2.2 compared to the CE anchor. | | | | |
|---|---|---|---|---|
| | Y | U | V | YUV |
| All intra | −0.03% | 0.74% | 0.60% | 0.11% |
| Random Access | 0.00% | 0.35% | 0.45% | 0.08% |
| Low delay B | | | | |

Here, the YUV value represents the combined BD-rates of the three components Y U and V, and is calculated as: YUV=(8*Y+U+V)/10.

From Table 1, we see that compared to the CE anchor, the combined YUV BD-rate of CE5-2.2 is 0.11% (All intra) and 0.08% (Random Access). This means that the solution proposed in CE5-2.2 needs to use 0.11% (All intra) and 0.08% (Random Access) more bits to get the same quality in terms of PSNR than the CE anchor.

In this disclosure, an improved low complexity CC-ALF is presented. Instead of restricting the CC-ALF coefficient values to be a value from the set $Z_{two}$, the disclosure proposes extending the allowed CC-ALF coefficient values. To keep the CC-ALF design to be of low complexity, the proposals do not reintroduce a multiplication in the CC-ALF filtering process but uses shifts and adds to calculate the residual correction $\Delta I_i(x,y)$.

According to a first aspect of the present disclosure there is provided a method for encoding or decoding an image. The method comprises obtaining a first luma sample value, L1, associated with the image. The method comprises obtaining a second luma sample value, L2, associated with the image. The method further comprises obtaining a first luma delta value, $\Delta L1$, wherein $\Delta L1=L2-L1$. The method comprises obtaining a first product, P1, using $\Delta L1$ and a first coefficient value, C1, wherein P1=(C1)($\Delta L1$). The method comprises calculating a first residual correction value, $\Delta I1$, using P1 and a set of other products. The method comprises filtering an unfiltered chroma value, $R_C$, associated with the image using the first residual correction value, $\Delta I1$ thereby producing a filtered chroma value $R_C^F$ associated with the image.

According to a second aspect of the present disclosure there is provided a computer program comprising instructions which, when executed by processing circuitry, causes the processing circuitry to perform the method according to the first aspect.

According to a third aspect of the present disclosure there is provided a carrier comprising the computer program according to the second aspect, wherein the carrier is one of an electronic signal, an optical signal, a radio signal, and a computer readable storage medium.

According to a fourth aspect of the present disclosure there is provided an apparatus, the apparatus being adapted to perform the method according to the first aspect.

At least one of the aspects provide as an advantage a BD-rate improvement compared to the low-complexity CC-ALF designs proposed in CE5-2.1 and CE5-2.2.

DETAILED DESCRIPTION

Figure 1:
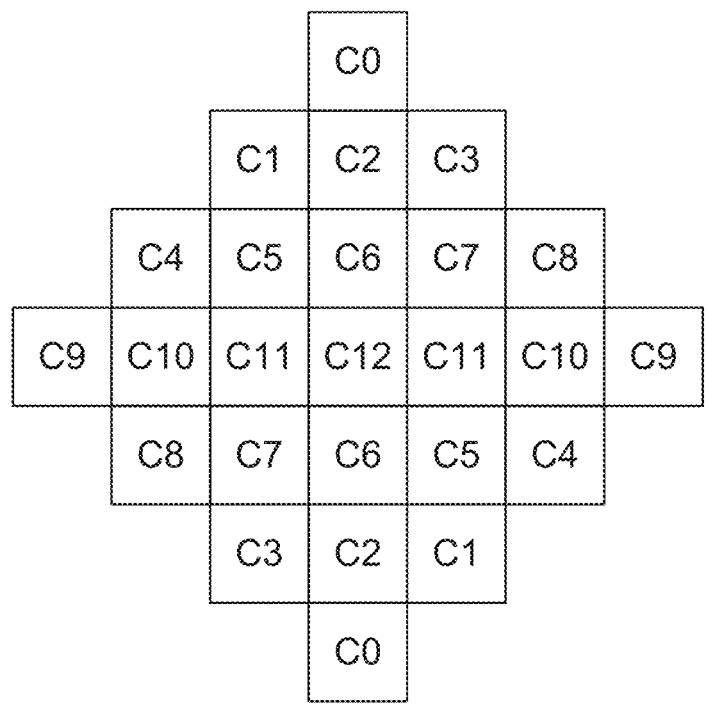
FIG. 1 illustrates a coefficient pattern.
Figure 2:
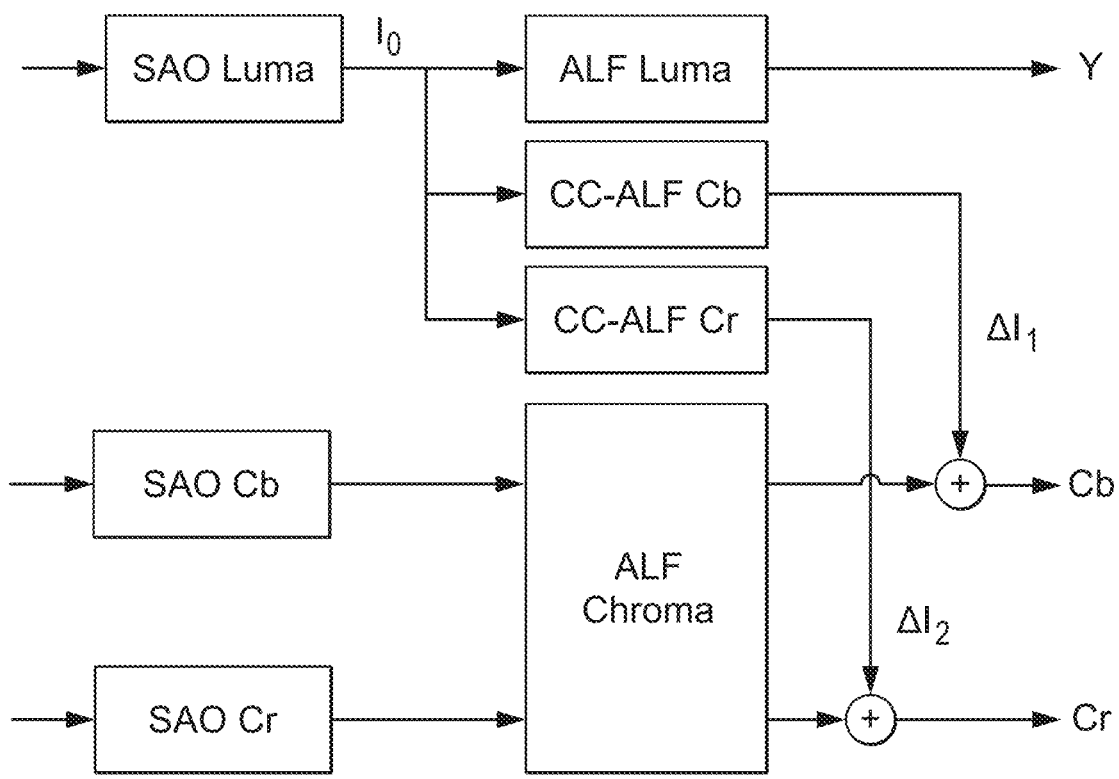
FIG. 2 illustrates the placement of CC-ALF with respect to the other loop filters.
Figure 3:
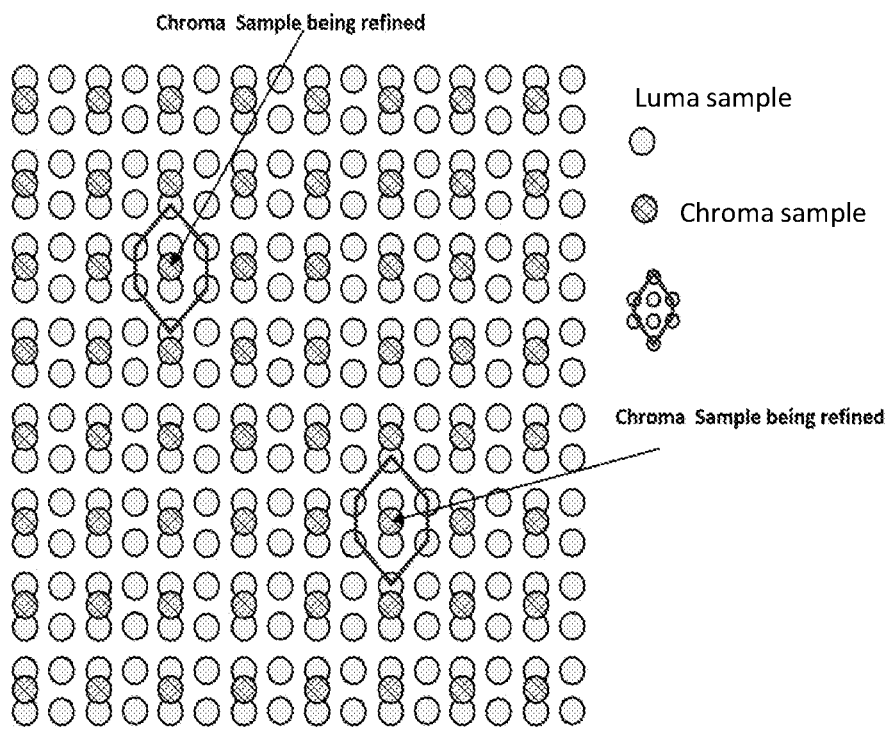
FIG. 3 shows the CE anchor CC-ALF filter shape for 4:2:0 color format with one type of chroma location where chroma is aligned horizontally but in-between luma samples vertically.
Figure 4:
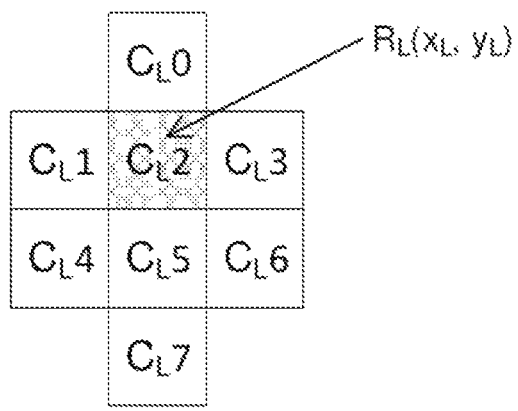
FIG. 4 shows the 8-tap 3×4 diamond CC-ALF filter coefficient respect to the luma sample location.
Figure 5:
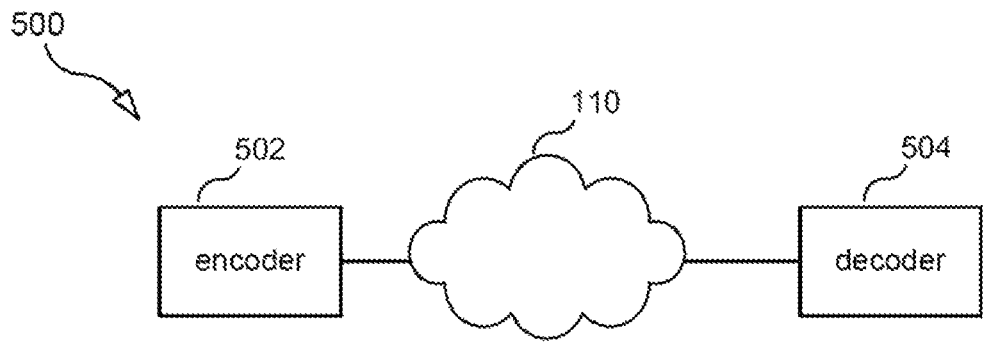
FIG. 5 illustrates a system according to an example embodiment.

FIG. 5 illustrates a system 500 according to an example embodiment. System 500 includes an encoder 502 and a decoder 504. In the example shown, decoder 504 can receive via a network 110 (e.g., the Internet or other network) encoded images produced by encoder 502.

Figure 6:
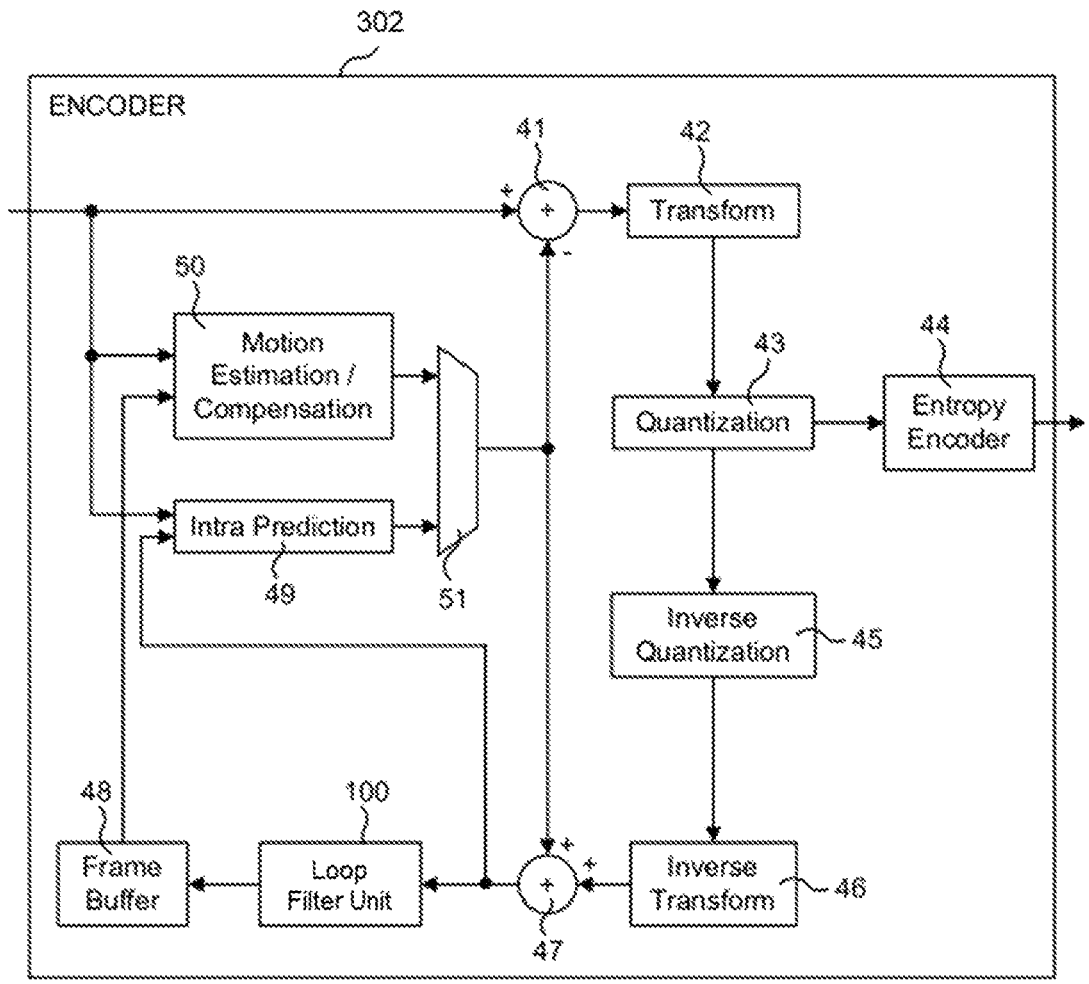
FIG. 6 is a schematic block diagram of an encoder according to an example embodiment.

FIG. 6 is a schematic block diagram of encoder 502. As illustrated in FIG. 6, The encoder 502 takes in an original image and subtracts a prediction 41 that is selected 51 from either previously decoded samples ("Intra Prediction" 49) or samples from previously decoded frames stored in the frame buffer 48 through a method called motion compensation 50. The task of finding the best motion compensation samples is typically called motion estimation 50 and involves comparing against the original samples. After subtracting the prediction 41 the resulting difference is transformed 42 and subsequently quantized 43. The quantized results are entropy encoded 44 resulting in bits that can be stored, transmitted or further processed. The output from the quantization 43 is also inversely quantized 45 followed by an inverse transform 46. Then the prediction from 51 is added 47 and the result is forwarded to both the intra prediction unit 49 and to the Loop filter Unit 100. The loop filter unit 100 may do deblocking, SAO and/or ALF filtering (including CC-ALF filtering). The result is stored in the frame buffer 48, which is used for future prediction. Not shown in FIG. 6 is that coding parameters for other blocks such as 42, 43, 49, 50, 51 and 100 also may also be entropy coded.

Figure 7:
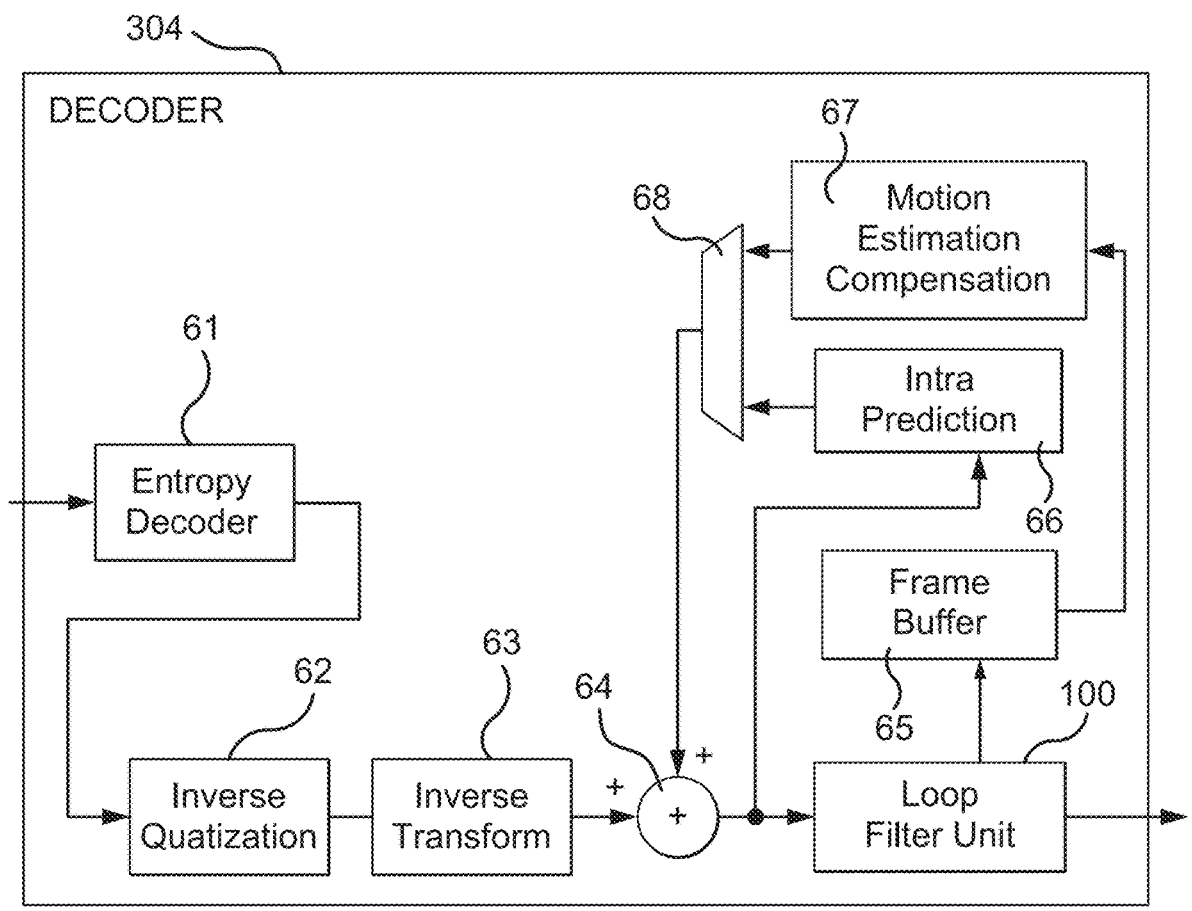
FIG. 7 is a schematic block diagram of a decoder according to an example embodiment.

FIG. 7 is a corresponding schematic block diagram of decoder 504 according to some embodiments. The decoder 504 takes in entropy coded transform coefficients which are then decoded by decoder 61. The output of decoder 61 then undergoes inverse quantization 62 followed by inverse transform 63 to form a decoded residual. To this decoded residual, a prediction is added 64. The prediction is selected 68 from either a motion compensation unit 67 or from an intra prediction unit 66. After having added the prediction to the decoded residual 64, the samples can be forwarded for intra prediction of subsequent blocks. The samples are also forwarded to the loop filter unit 100, which may do deblocking, SAO processing, and/or ALF processing (including CC-ALF filtering). The output of the loop filter unit 100 is forwarded to the frame buffer 65, which can be used for motion compensation prediction of subsequently decoded images 67. The output of the loop filter unit 100 can also be output the decoded images for viewing or subsequent processing outside the decoder. Not shown in FIG. 7 is that parameters for other blocks such as 63, 67, 66 and 100 may also be entropy decoded. As an example, the coefficients for the ALF filter in block 100 may be entropy decoded.

In one embodiment, to achieve the advantages discussed above, the allowed CC-ALF coefficient values of low complexity CC-ALF design are extended, but extended in such a way that there is an inexpensive way to implement the required multiplication.

Figure 8:
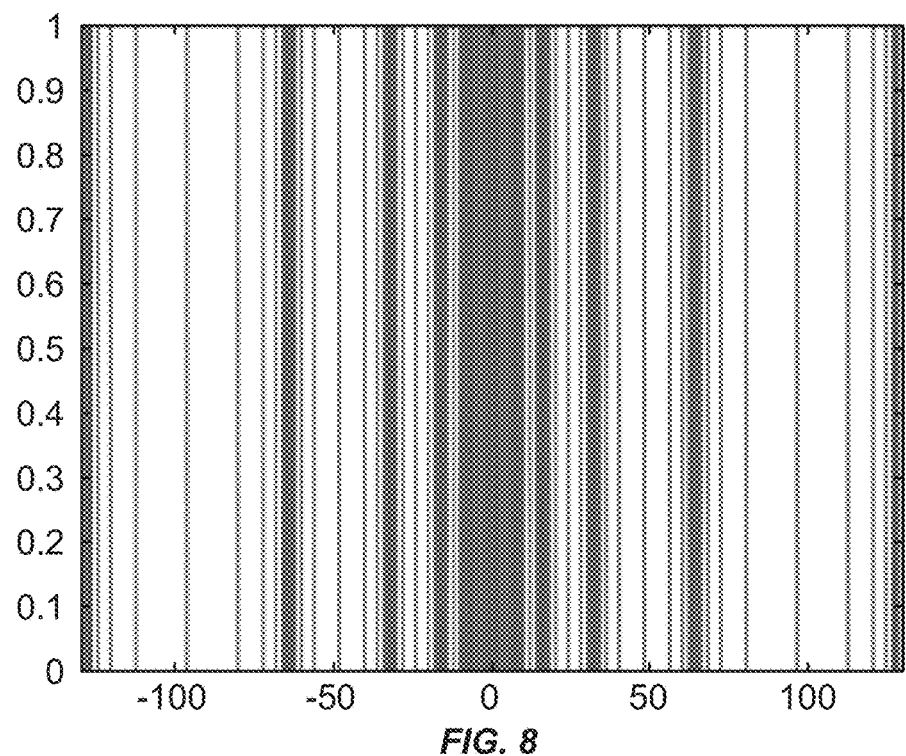
FIG. 8 shows all the values in set $Z^{128}$.

Firstly, the values that can be written as 0 or $\pm 2^n$ or $\pm 2^n \pm 2^m$ up to a magnitude $<=M$ are defined as the set $Z^M$. As an example, all values in $Z^{128}$ are between and inclusive of $-128$ and $128$, thus the values in $Z^{128}$ are: $+/-\{0, 1, 2, 3, 4, 5, 6, 7, 8, 9, 10, 12, 14, 15, 16, 17, 18, 20, 24, 28, 30, 31, 32, 33, 34, 36, 40, 48, 56, 60, 62, 63, 64, 65, 66, 68, 72, 80, 96, 112, 120, 124, 126, 127, 128\}$. FIG. 8 shows all the values in set $Z^{128}$.

The values that can be written as 0 or $\pm 2^n$ up to a magnitude $<=M$ are defined as set $Z_{two}^M$. As an example, $Z_{two}^{128}$ includes the values $+/-\{5\ 0, 1, 2, 4, 8, 16, 32, 64, 128\}$.

A set $Z_{npot}^M$ is dervied by removing the values in $Z_{two}^m$ from the set $Z^M$. As an example, of $Z_{npot}^{128}$ set is $\{-127, -126, -124, -120, -112, -96, -80, -72, -68, -66, -65, -63, -62, -60, -56, -48, -40, -36, -34, -33, -31, -30, -28, -24, -20, -18, -17, -15, -14, -12, -10, -9, -7, -6, -5, -3, 3, 5, 6, 7, 9, 10, 12, 14, 15, 17, 18, 20, 24, 28, 30, 31, 33, 34, 36, 40, 48, 56, 60, 62, 63, 65, 66, 68, 72, 80, 96, 112, 120, 124, 126, 127\}$.

A subset of $Z^M$ (denoted $Z_{sub}$) is defined where $Z_{sub}$ contains at least one value from $Z_{npot}^M$.

This disclosure proposes to use a filter that is operable to filter a sample using any set of N filter coefficients from $Z_{sub}$. Furthermore, the filter should also be constrained so that each coefficient value must belong to the set $Z_{sub}$.

One special case of this is when $Z_{sub}=Z_{two}^M+Z_{ext}$, where the values in $Z_{two}^M$ are the ones in $Z_{sub}$ that can be written as 0 or $\pm 2^n$ and where the values in $Z_{ext}$ are the ones that cannot (but are available in $Z^M$).

1. Hardware Complexity Assert for a Coefficient Value is Power-of-Two Multiples of 0, 1, 3

In one embodiment, the CC-ALF coefficients are extended so that they can be written as either 0 or $\pm 2^n$ or $\pm(2^n+2^{n-1})$.

Given the values ranges between $-128$ and $128$, one example of the $Z_{ext}$ set in this embodiment is $\{-96, -48, -24, -12, -6, -3, 3, 6, 12, 24, 48, 96\}$. Here, $Z_{two}^{128}=\{-128, -64, -32, -16, -8, -4, -2, -1, 0, 1, 2, 4, 8, 16, 32, 64, 128\}$. The set $Z_{sub}$ from which one should select filter coefficients then becomes $Z_{sub}=\{-128, -96, -64, -48, -32, -24, -16, -12, -8, -6, -4, -3, -2, -1, 0, 1, 2, 3, 4, 6, 8, 12, 16, 24, 32, 48, 64, 96, 128\}$.

Given the values ranges between −64 and 64, one example of the $Z_{ext}$ set in this embodiment is $\{-48, -24, -12, -6, -3, 3, 6, 12, 24, 48\}$. Here, $Z_{two}^{64}=\{-64, -32, -16, -8, -4, -2, -1, 0, 1, 2, 4, 8, 16, 32, 64\}$. The set $Z_{sub}$ from which one should select filter coefficients then becomes $Z_{sub}=\{-64, -48, -32, -24, -16, -12, -8, -6, -4, -3, -2, -1, 0, 1, 2, 3, 4, 6, 8, 12, 16, 24, 32, 48, 64\}$.

Given the values ranges between −32 and 32, one example of the $Z_{ext}$ set in this embodiment is $\{-24, -12, -6, -3, 3, 6, 12, 24\}$. Here, $Z_{two}^{32}=\{-32, -16, -8, -4, -2, -1, 0, 1, 2, 4, 8, 16, 32\}$. The set $Z_{sub}$ from which one should select filter coefficients then becomes $Z_{sub}=\{-32, -24, -16, -12, -8, -6, -4, -3, -2, -1, 0, 1, 2, 3, 4, 6, 8, 12, 16, 24, 32\}$.

Given the values ranges between −16 and 16, one example of the $Z_{ext}$ set in this embodiment is $\{-12, -6, -3, 3, 6, 12\}$. Here, $Z_{two}^{16}=\{-16, -8, -4, -2, -1, 0, 1, 2, 4, 8, 16\}$. The set $Z_{sub}$ from which one should select filter coefficients then becomes $Z_{sub}=\{-16, -12, -8, -6, -4, -3, -2, -1, 0, 1, 2, 3, 4, 6, 8, 12, 16\}$.

Given the values ranges between −8 and 8, one example of the $Z_{ext}$ set in this embodiment is $\{-6, -3, 3, 6\}$. Here, $Z_{two}^{8}=\{-8, -4, -2, -1, 0, 1, 2, 4, 8\}$. The set $Z_{sub}$ from which one should select filter coefficients then become $Z_{sub}=\{-8, -6, -4, -3, -2, -1, 0, 1, 2, 3, 4, 6, 8\}$.

Figure 9:
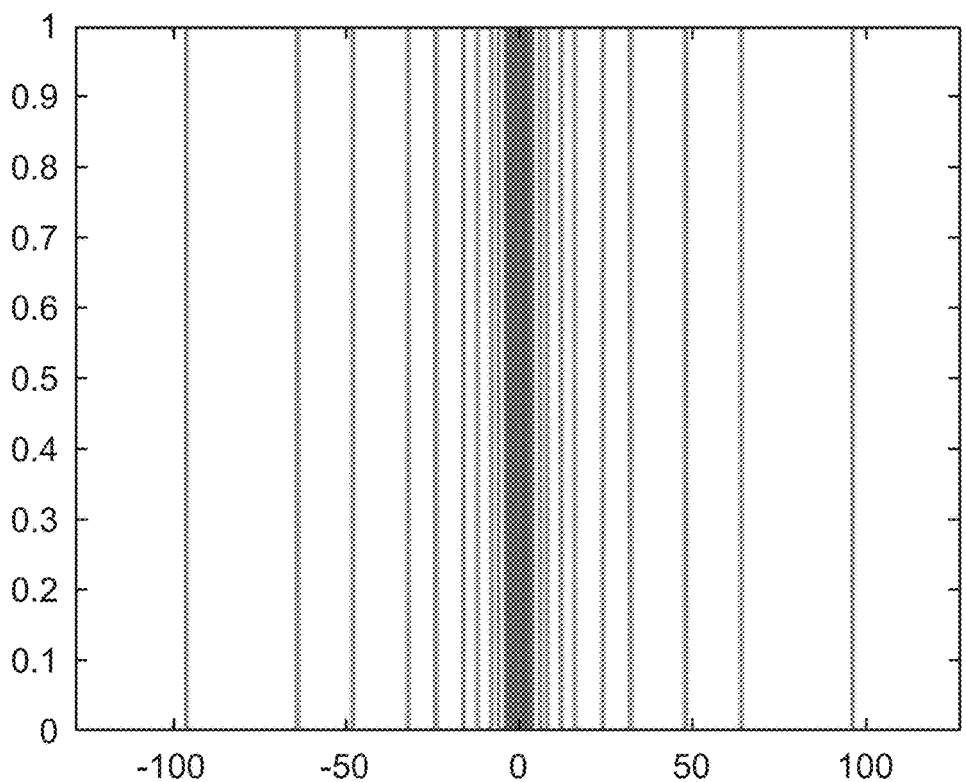
FIG. 9 shows all the values that can be written as either 0, $\pm 2^n$ or $\pm(2^n+2^{n-1})$.

FIG. 9 shows all the values that can be written as either 0, $\pm 2^n$ or $\pm(2^n+2^{n-1})$.

From here, this disclosure explains why the extended CC-ALF coefficient values in $Z_{sub}$ can keep the low complexity CC-ALF filtering process in term of hardware multiplication design even though the coefficients from the $Z_{ext}$ set $\{-96, -48, -24, -12, -6, -3, 3, 6, 12, 24, 48, 96\}$ that cannot be written as a pure power of two are included.

To calculate the sum value from Equation 4, one needs to perform several multiplications on the form a*b, where a is an allowed coefficient, i.e., it belongs to the set $Z_{sub}=\{Z_{two}, Z_{ext}\}$, and b is a luma reconstructed sample value, i.e., given a luma bitDepth=12, it can take any value in the range [0, 4095], needing a 12-bit variable to hold it.

In the special case where every value in $Z_{ext}$ can be written as $+(2^n+2^{n-1})$ we can write each such value as $\pm 2^{n-1}(2+1)=+2^{n-1}*3$. Hence the value a is either a pure power-of-two or a pure power-of-two multiplied by three. This can be written as:

$$a=\pm(k_1*2+k_0*1)*2^s \quad \text{(Eqn 5)}$$

where $k_0$ and $k_1$ can take the values of 0 or 1. In the case when we have a pure power-of-two, such as 128, we set $k_1=1$, $k_0=0$ and s to a suitable shift value, 6 in the case of 128. (Since $k_1=1$ we multiply by two, hence we should use 6 to represent 128.) In the case when we have a power-of-two number multiplied by three, such as 96, we set both $k_1$ and $k_0$ to 1, and use a suitable shift value, such as 5 in the case of 96. Table 2 shows possible values for $k_1$, $k_0$ and s for the values in S. It also shows the value n, which indicates if the value should be negated.

TABLE 2

How to write the allowed coefficients on the form $(-1)^n(2k_1 + k_0)2^s$

| coefficient | $k_1$ | $k_0$ | s | n |
|---|---|---|---|---|
| −128 | 1 | 0 | 6 | 1 |
| −96 | 1 | 1 | 5 | 1 |
| −64 | 1 | 0 | 5 | 1 |
| −48 | 1 | 1 | 4 | 1 |
| −32 | 1 | 0 | 4 | 1 |
| −24 | 1 | 1 | 3 | 1 |
| −16 | 1 | 0 | 3 | 1 |
| −12 | 1 | 1 | 2 | 1 |
| −8 | 1 | 0 | 2 | 1 |
| −6 | 1 | 1 | 1 | 1 |
| −4 | 1 | 0 | 1 | 1 |
| −3 | 1 | 1 | 0 | 1 |
| −2 | 1 | 0 | 0 | 1 |
| −1 | 0 | 1 | 0 | 1 |
| 0 | 0 | 0 | 0 | 0 |
| 1 | 0 | 1 | 0 | 0 |
| 2 | 1 | 0 | 0 | 0 |
| 3 | 1 | 1 | 0 | 0 |
| 4 | 1 | 0 | 1 | 0 |
| 6 | 1 | 1 | 1 | 0 |
| 8 | 1 | 0 | 2 | 0 |
| 12 | 1 | 1 | 2 | 0 |
| 16 | 1 | 0 | 3 | 0 |
| 24 | 1 | 1 | 3 | 0 |
| 32 | 1 | 0 | 4 | 0 |
| 48 | 1 | 1 | 4 | 0 |
| 64 | 1 | 0 | 5 | 0 |
| 96 | 1 | 1 | 5 | 0 |
| 128 | 1 | 0 | 6 | 0 |

The decoder can use Table 2 to determine the values of $k_1$, $k_0$, s and n from the coefficient. An alternative is to use the following pseudo code for a coefficient coeff:

k1=(abs(coeff)<2?0:1);
k0=coeff & 1;
s=max(0, 6−clz(abs(coeff)));
n=sign(coeff).

Here abs(x) denotes absolute value of x, & denotes bitwise AND, max(a,b) returns the largest value of a and b, clz(x) counts the leading number of zeros in x, so the 8-bit number 00001111 will return 3, and sign(x) returns the sign of x. clz( ) is a common assembly instruction on most CPUs so it is inexpensive.

Note that this conversion only needs to happen when the coefficients are read from the APS, which is once per frame. Hence it is not critical that this conversion from coefficient to values is extremely fast or efficient. If, on the other hand, this conversion would have to happen every sample, it would be very important that it could be done quickly.

Once they have been converted, a hardware implementation can store them for later use during the filtering. Since of $k_1$, $k_0$, and n are 1-bit values, and s is a 3-bit value, the total number of bits that needs to be stored is 6 bits.

a can be written in the form of: $a=(-1)^n(2k_1+k_0)2^s$, hence one can rewrite the multiplication a*b as:

$$a*b == (-1)^n(2k_1+k_0)2^s * b = \quad \text{(Eqn 6)}$$
$$(-1)^n(2*b*k_1+b*k_0)2^s = (-1)^n((b*k_1)\ll 1)+b*k_0)2^s.$$

To evaluate the bottom-most expression, we can start by multiplying b by $k_1$. Since $k_1$ is either 0 or 1 this is the same as doing AND between every bit in b and $k_1$. After this, we will shift it one step left. Likewise, we will do AND between b and $k_0$. We add these two results together, negate it if necessary and shift it 0 to 6 steps. Since the multiplications can be replaced by ANDs, Equation 6 can be written as:

$$a*b=(-1)^n(((b \&_b k_1)<<1)+b \&_b k_0)2^s, \quad \text{(Eqn 6b)}$$

where x $\&_b$ y is used to denote that every bit in x is ANDed with the one-bit value y. Equation 6b can be efficiently implemented by the circuit shown in FIG. 10.

Figure 10:
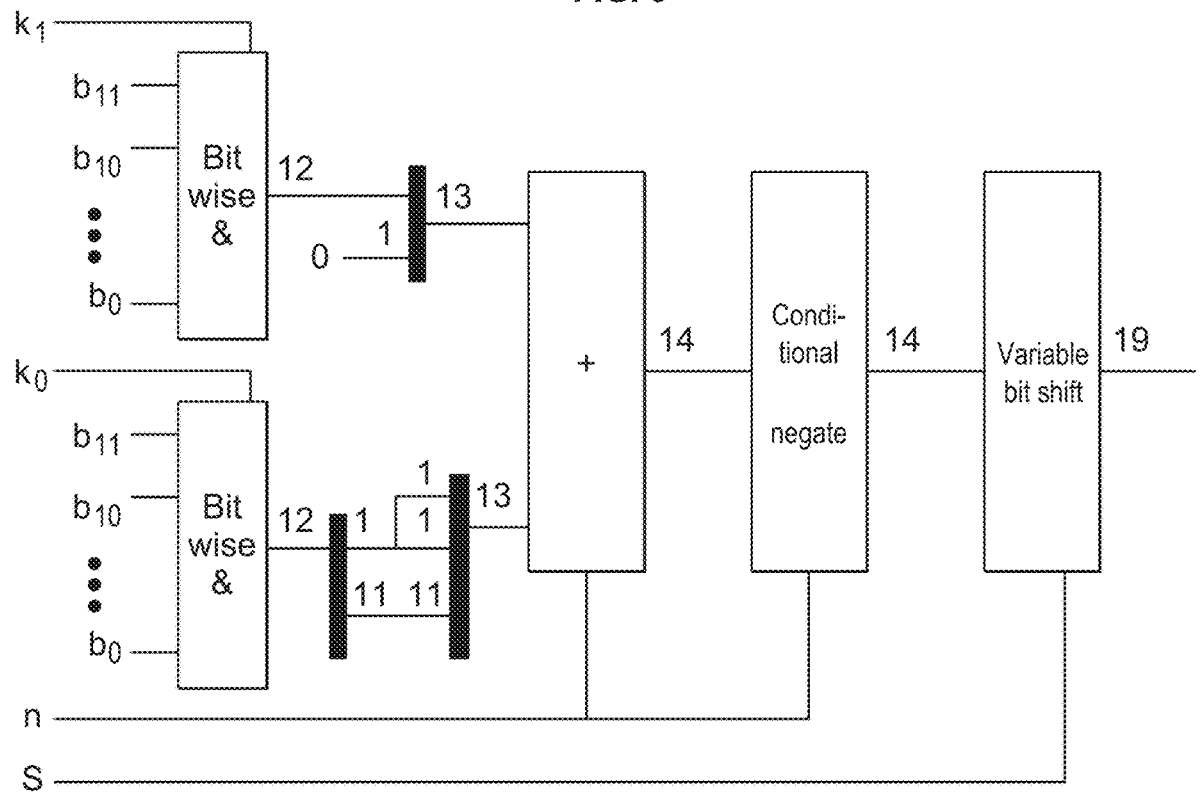
FIG. 10 is a circuit diagram.

FIG. 10. An inexpensive way to implement the multiplication a*b, where a belong to set S.

Figure 11:
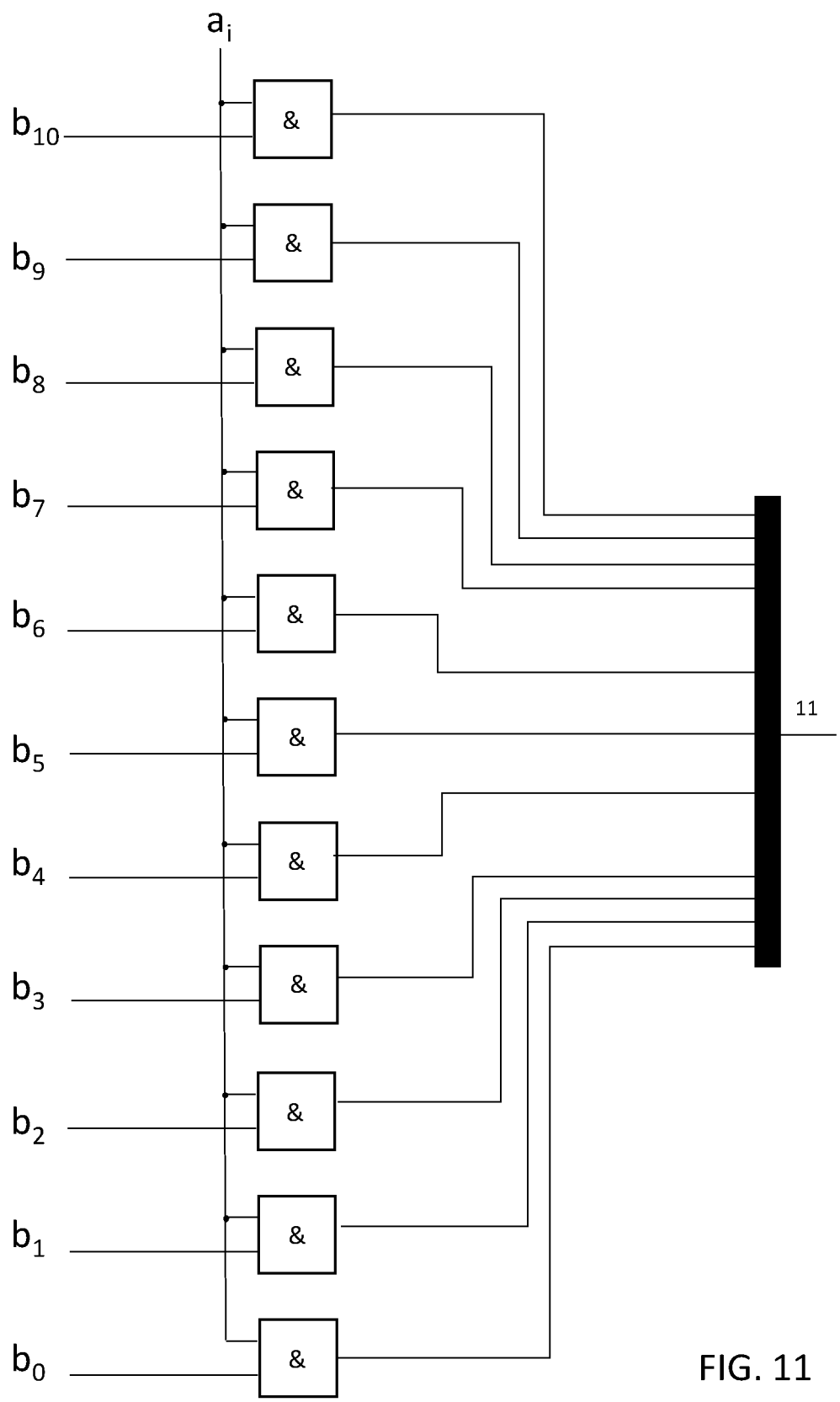
FIG. 11 illustrates a hardware implementation.

As can be seen in FIG. 10, the top left unit marked "bit-wise &" takes in the 12-bit number $b=b_{11}b_{10}b_9b_8b_7b_6b_5b_4b_3b_2b_1b_0$, where $b_{11}$ is the most significant bit, and does a bit-wise AND with $k_1$ according to $\text{out}_k = b_k \& k_1$. FIG. 11 shows how such a unit can be implemented in hardware using only 11 AND-gates, which are one of the least expensive computational units available in hardware. That is, FIG. 11. illustrates an implementation of the "bit-wise &" box in FIG. 10

The output of the top left unit is shifted one bit, and a zero is inserted in the least significant bit position. This means that the resulting value is 13 bits.

Figure 11B:
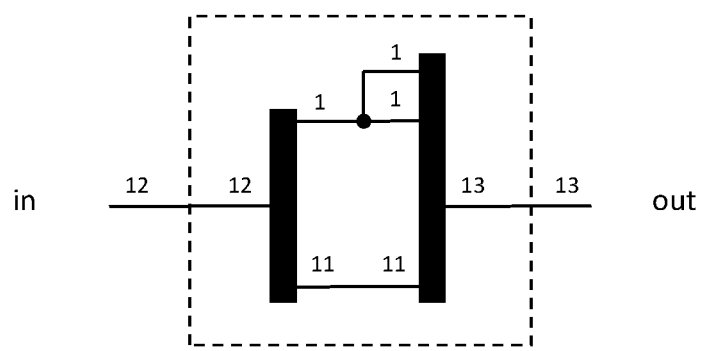
FIG. 11B is a wiring diagram.
Figure 11B:
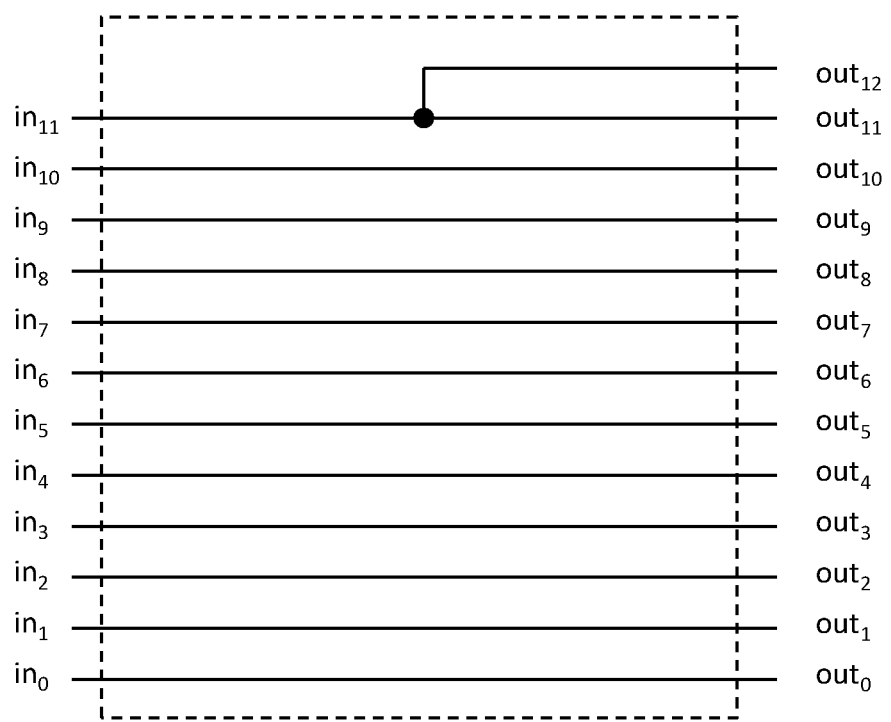

In a similar manner, the value b is bit-wise AND:ed with $k_0$ in the bottom-left unit marked "bit-wise &". The output is not shifted, instead the sign bit is extended so that the result is also 13 bits. This is indicated by the wiring diagram between the lower "bit-wise &" unit and the adder. As can be seen in FIG. 11b, this does not contain any logic.

The input bits are copied to the output, and the most significant bit inti is copied to the two most significant bits in the output $\text{out}_{12}$ and $\text{out}_{11}$.

Figure 12:
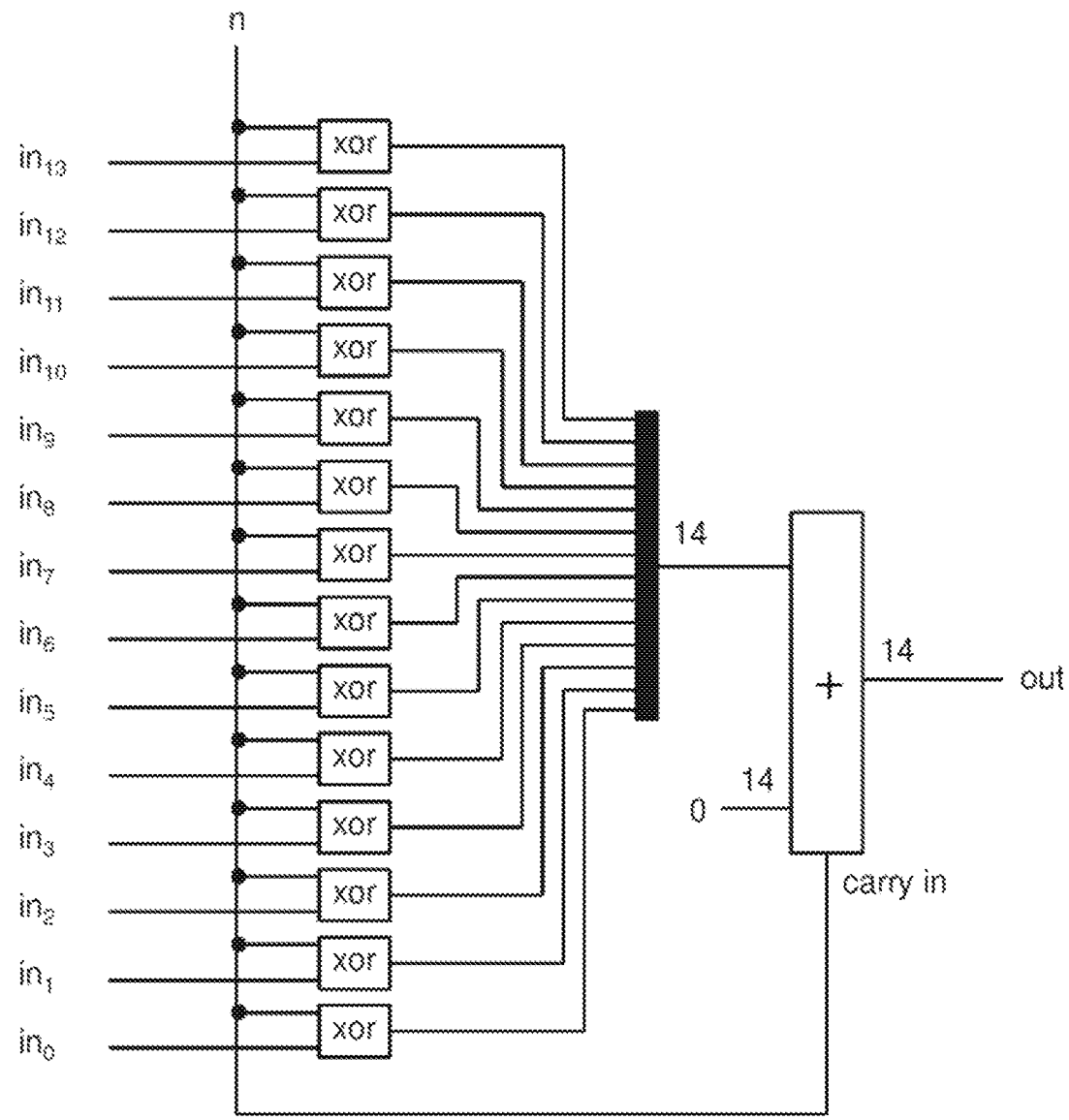
FIG. 12 illustrates an example of how to implement a conditional negater.

These 13-bit values are then added together using a 13-bit adder. The output is 14 bits, since one bit may carry. This result is then input to the unit marked "conditional negate", which implements the multiplication of $(-1)^n$. FIG. 12 shows how such a unit can be implemented in hardware. That is, FIG. 12 illustrates an example of how to implement a conditional negater. If the value n is 1, the input value is negated. If the value is 0, the input value is left untouched.

As is well-known for a person skilled in the art, it is possible to negate a value by inverting all the bits and adding 1. This should only be done in the case when n=1. By using an XOR gate, each input bit is inverted in the case when n=1, and left untouched when n=0. The result is then fed to an adder, where the other input is zero, and where the carry-in is set to n. This means that it will leave the value untouched if n=0, but if n=1 it will add 1. The result is a 14-bit value which is negated in relation to the input if n=1 and left untouched otherwise.

Figure 13:
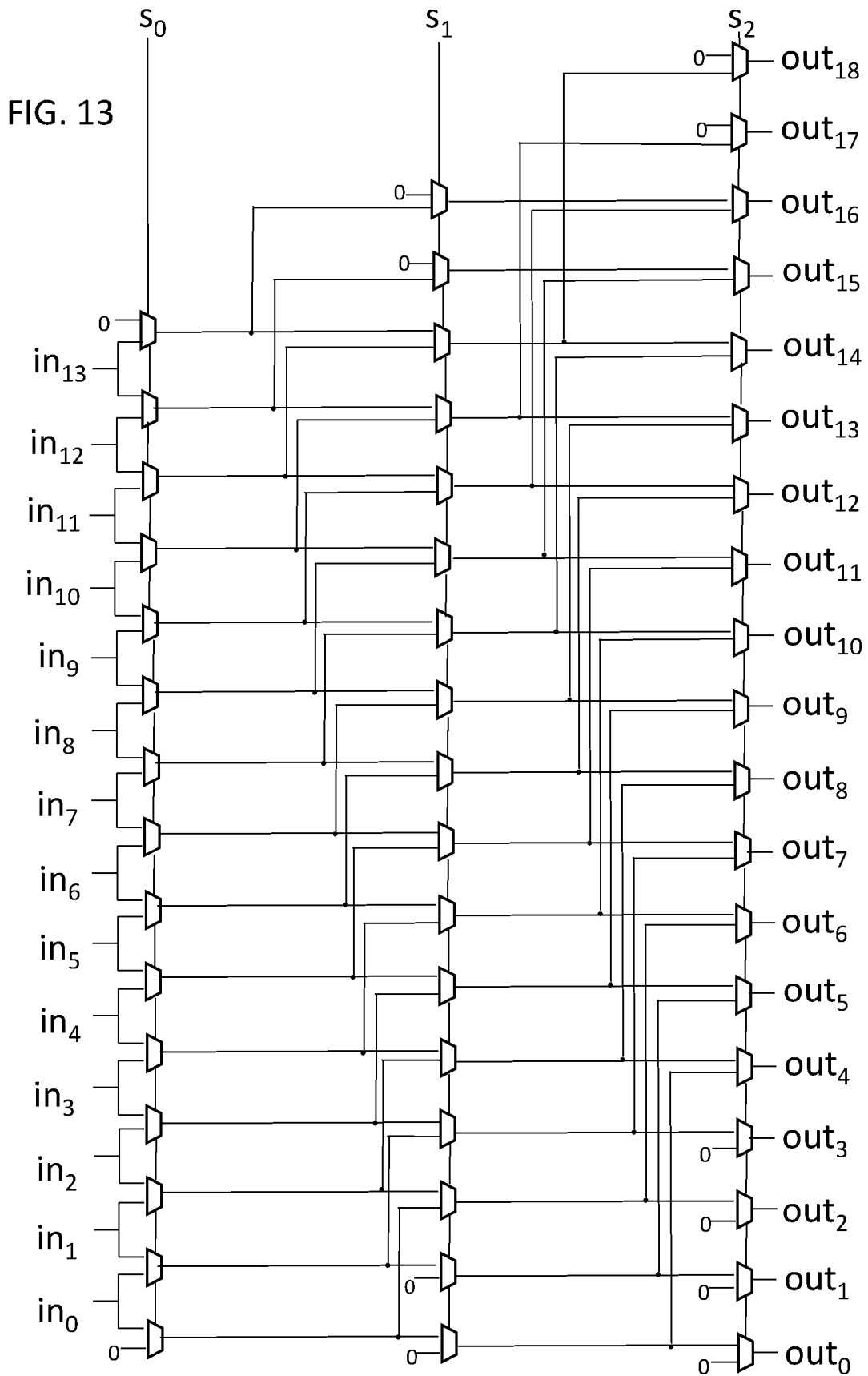
FIG. 13 illustrates a barrel-shifter.

Finally, the right-most box in FIG. 10 marked "variable bit shift" implements the multiplication by $2^s$. This can be efficiently implemented using a barrel shifter, as shown in FIG. 13. FIG. 13 illustrates a barrel-shifter that shifts the input up to 6 steps to the left (up in FIG. 13), controlled by the parameter $s=s_2s_1s_0$, where $s_2$ is the most-significant bit in s.

The barrel-shifter in FIG. 13 consists of 51 1-bit multiplexors, and although it may seem complex, it can be implemented very efficiently in hardware. The input to the barrel shifter is shifted s steps to the left, where $s=s_2s_1s_0$ and where $s_2$ is the most significant bit.

FIG. 10 through FIG. 13 are just examples of how to implement this type of multiplication. Often there are less expensive methods to implement the various building blocks in FIG. 10. As an example, FIG. 12 uses an adder where one of the inputs are set to zero. For a person skilled in the art, it is clear that this does not need to be implemented using a full general adder, but it is possible to reduce the size of this adder since we already know that one input will be zero.

The two most expensive operations are the 13-bit adder and the barrel shift. Assuming that the barrel-shifter is approximately as complex as the adder, the cost of implementation is down to approximately two 13-bit adders.

2. Hardware Complexity Assert for a Coefficient Value is Power-of-Two Multiples of 0, 1, 3 and 5:

In some circumstances it may be limiting to constrain the coefficients to only be of the form $\pm\{0, 1, 3\}\times 2^n$. Most coefficients are close to zero, which means that it is most important to be able to represent coefficients close to zero, such as $\{0, \pm 1, \pm 2, \pm 3, \pm 4, \pm 5, \pm 6, \pm 7, \pm 8, \pm 9, \pm 10\}$. Out of these only $\{0, \pm 1, \pm 2, \pm 3, \pm 4, \pm 6, \pm 8\}$ are possible to represent on the form $\pm\{0, 1, 3\}\times 2^n$. However, if we also allow $5\times 2^n$, we can also represent $\pm 5$ and $\pm 10$. As it turns out, it is not much more expensive to create hardware that allows for $\pm\{0, 1, 3, 5\}\times 2^n$ than it is to create hardware that allows $\pm\{0, 1, 3\}\times 2^n$. The reason for this is that, just as for the factor 3, multiplying a number by 5 can also be implemented using a single addition and shifts, since $5x=4x+x=(x<<2)+x$.

In general, one can modify Equation 6b so that we will be able to incorporate also a multiplication a*b when a=5:

$$a*b=(-1)^n(((b \&_b k_1)<<s_0)+b \&_b k_0)2^{s_1} \quad \text{(Eqn 7b)}$$

Figure 14:
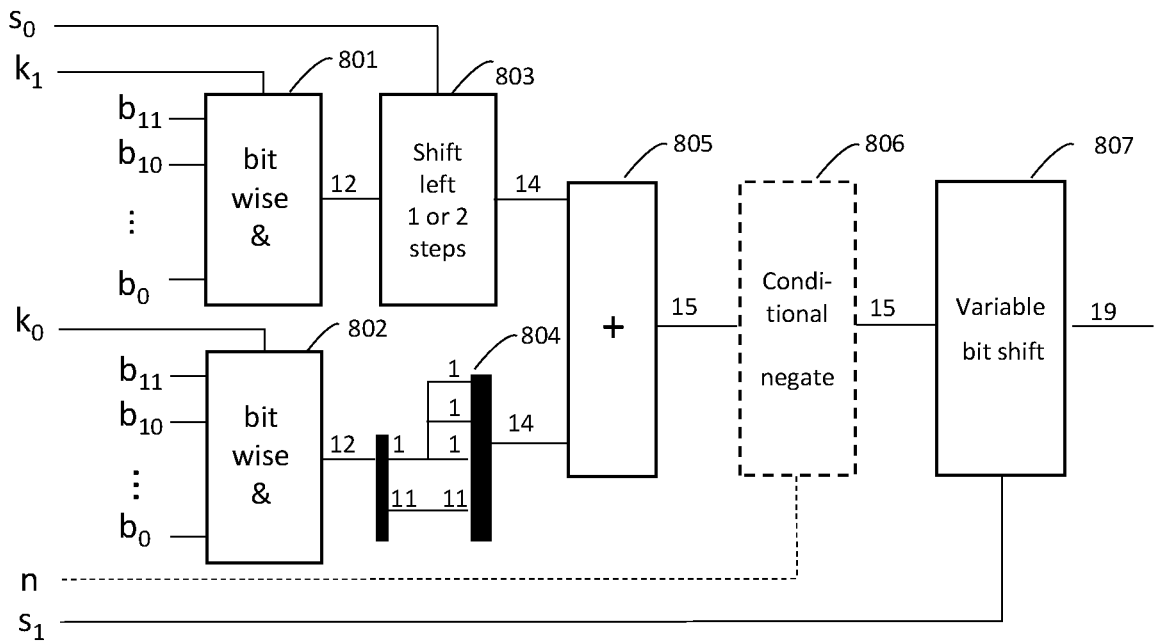
FIG. 14 illustrates a circuit that can implement coefficients of the form $\pm\{0, 1, 3, 5\} \times 2^n$.

The difference compared to Equation 6 is that, instead of always shifting 1 step, we now shift 1 or 2 steps, controlled by the variable $s_0$. Another change compared to Equation 5 is that the variable s has changed name to $s_1$. FIG. 14 shows how such a hardware implementation can be constructed. That is, FIG. 14 illustrates a circuit that can implement coefficients of the form $\pm\{0, 1, 3, 5\}\times 2^n$.

Figure 15:
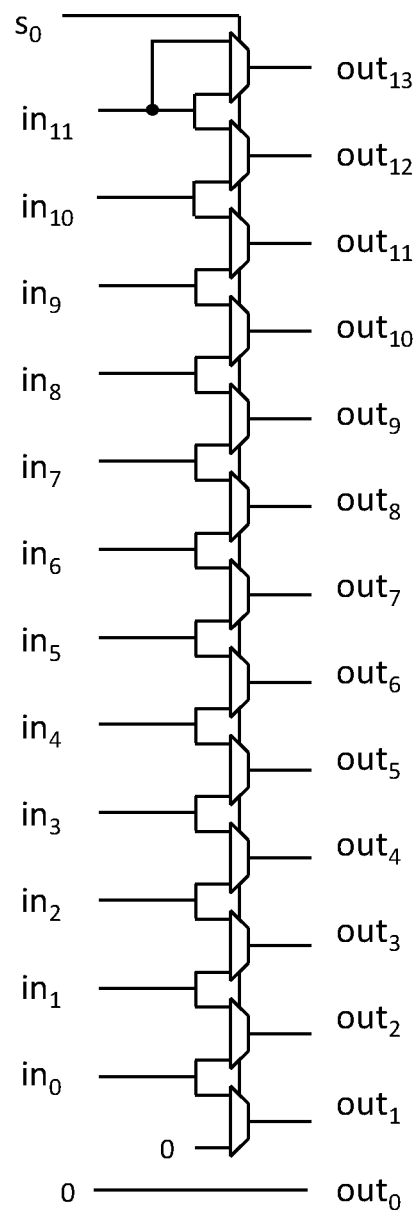
FIG. 15 illustrates a circuit to implement a shift left with 1 step (if $s_0=0$) or 2 steps (if $S_0=1$).

When comparing the diagram in FIG. 14 to the one in FIG. 10 we see that the major difference is the box marked 803. This now shifts the value b $\&_b$ $k_1$ left either one or two steps, whereas in FIG. 10 it always shifts left one step. This means that both $3*b=(b<<1)+b$ and $5*b=(b<<2)+b$ can be constructed as output of the adder 805. This shift is controlled by the shift value $s_0$, which shifts 1 step if $s_0=0$ and two steps if $s_0=1$. The box 803 can be implemented inexpensively using 13 1-bit muxes as shown in FIG. 15. FIG. 15 illustrates a circuit to implement a shift left with 1 step (if $s_0=0$) or 2 steps (if $s_0=1$).

The other difference against FIG. 14 is that the output of 802 is now sign-extended two bits to go from a signed 12-bit number to a signed 14-bit number using the wiring marked with 804. It is now possible to use a coefficient set such as $S_{135}=\pm\{0, 1, 2, 3, 4, 5, 6, 8, 10, 12, 16, 20, 24, 32, 40, 48, 64\}$. Table 3 shows what values to set for $k_2$, $s_0$ and $s_1$ to obtain the positive coefficients in $S_{135}$. (The value n is 0 for the positive coefficients.) The values for $k_1$, $k_2$, $s_0$ and $s_1$ for the negative coefficients are the same as for the positive coefficients, but n=1.

TABLE 3

How to write the allowed coefficients on the form
$(-1)^n(2(k_1 << s_0) + k_0)2^{s_1}$.

| coefficient | $k_1$ | $k_0$ | $s_0$ | $s_1$ |
|---|---|---|---|---|
| 0 | 0 | 0 | 0 | 0 |
| 1 | 0 | 1 | 0 | 0 |
| 2 | 1 | 0 | 0 | 0 |
| 3 | 1 | 1 | 0 | 0 |
| 4 | 1 | 0 | 0 | 1 |
| 5 | 1 | 1 | 1 | 0 |

TABLE 3-continued

How to write the allowed coefficients on the form
$(-1)^n(2(k_1 << s_0) + k_0)2^{s_1}$.

| coefficient | $k_1$ | $k_0$ | $s_0$ | $s_1$ |
|---|---|---|---|---|
| 6 | 1 | 1 | 0 | 1 |
| 8 | 1 | 0 | 0 | 2 |
| 10 | 1 | 1 | 1 | 1 |
| 12 | 1 | 1 | 0 | 2 |
| 16 | 1 | 0 | 0 | 3 |
| 20 | 1 | 1 | 1 | 2 |
| 24 | 1 | 1 | 0 | 3 |
| 32 | 1 | 0 | 0 | 4 |
| 40 | 1 | 1 | 1 | 3 |
| 48 | 1 | 1 | 0 | 4 |
| 64 | 1 | 0 | 0 | 5 |

In one embodiment, we extend the CC-ALF coefficients, so that they can be written as either $\pm 2^n$ or $\pm(2^n+2^{n-1})$ or $\pm(2^n+2^n-2)$.

Given the values ranges between −128 and 128, one example of the $Z_{ext}$ set in this embodiment is {−96, −80, −48, −40, −24, −20, −12, −10, −6, −5, −3, 3, 5, 6, 10, 12, 20, 24, 40, 48, 80, 96}. Here, $Z_{two}$ 12 8 {−128, −64, −32, −16, −8, −4, −2, −1, 0, 1, 2, 4, 8, 16, 32, 64, 128}. The set $Z_{sub}$ from which one should select filter coefficients then becomes $Z_{sub}$={−128, −96, −80, −64, −48, −40, −32, −24, −20, −16, −12, −10, −8, −6, −5, −4, −3, −2, −1, 0, 1, 2, 3, 4, 5, 6, 8, 10, 12, 16, 20, 24, 32, 40, 48, 64, 80, 96, 128}.

Given the values ranges between −64 and 64, one example of the $Z_{ext}$ set in this embodiment is {−48, −40, −24, −20, −12, −10, −6, −5, −3, 3, 5, 6, 10, 12, 20, 24, 40, 48}. Here, $Z_{two}^{64}$={−64, −32, −16, −8, −4, −2, −1, 0, 1, 2, 4, 8, 16, 32, 64}. The set $Z_{sub}$ from which one should select filter coefficients then becomes $Z_{sub}$={−64, −48, −40, −32, −24, −20, −16, −12, −10, −8, −6, −5, −4, −3, −2, −1, 0, 1, 2, 3, 4, 5, 6, 8, 10, 12, 16, 20, 24, 32, 40, 48, 64}.

Given the values ranges between −32 and 32, one example of the $Z_{ext}$ set in this embodiment is {−24, −20, −12, −10, −6, −5, −3, 3, 5, 6, 10, 12, 20, 24}. Here, $Z_{two}^{32}$={−32, −16, −8, −4, −2, −1, 0, 1, 2, 4, 8, 16, 32}. The set $Z_{sub}$ from which one should select filter coefficients then becomes $Z_{sub}$={−32, −24, −20, −16, −12, −10, −8, −6, −5, −4, −3, −2, −1, 0, 1, 2, 3, 4, 5, 6, 8, 10, 12, 16, 20, 24, 32}.

Given the values ranges between −16 and 16, one example of the $Z_{ext}$ set in this embodiment is {−12, −10, −6, −5, −3, 3, 5, 6, 10, 12}. Here, $Z_{two}^{16}$={−16, −8, −4, −2, −1, 0, 1, 2, 4, 8, 16}. The set $Z_{sub}$ from which one should select filter coefficients then becomes $Z_{sub}$={−16, −12, −10, −8, −6, −5, −4, −3, −2, −1, 0, 1, 2, 3, 4, 5, 6, 8, 10, 12, 16}.

Given the values ranges between −8 and 8, one example of the $Z_{ext}$ set in this embodiment is {−6, −5, −3, 3, 5, 6}. Here, $Z_{two}^{8}$={−8, −4, −2, −1, 0, 1, 2, 4, 8}. The set $Z_{sub}$ from which one should select filter coefficients then becomes $Z_{sub}$={−8, −6, −5, −4, −3, −2, −1, 0, 1, 2, 3, 4, 5, 6, 8}.

3. Software Implementations

The above description gives a detailed account for how to lower the implementation cost in hardware. In certain software architectures, it may also be faster to implement the multiplication a*b if it is known that a belongs to the set S. However, in other software architectures, a multiplication may not be so much more expensive than addition and shift in terms of speed. On such architectures it may not be possible to gain an advantage by using the current method. However, it is always possible to just implement it using a multiplication. Hence it can at least be said that regardless of the software architecture, the proposed extensions are never worse than the one currently in the VVC draft or the one in CE test.

4. Improving the Derivation of the Residual Correction $\Delta I_i(x,y)$

In the current CC-ALF anchor, the CC-ALF coefficient $C_L 2$ is derived in the encoder 502 by: $C_L 2=(-1)*(C_L 0+C_L 1+C_L 3+C_L 4+C_L 5+C_L 6+C_L 7)$, and it is then clipped to a value range between [−32, 31], inclusive.

This may give a filtering error since the sum of all 8 CC-ALF coefficients $C_{L\_sum}=\Sigma_{i=0}^{7}C_L(i)$ may not equal to 0 due to the clip.

Let's assume that in one local area (in one CTU for example) in the current picture, the luma reconstructed samples which are used in the CC-ALF filtering are very flat, one extreme example is that all luma reconstructed sample have the same sample value $R_{L\_const}$. According to equation 4, the residual correction is then derived as:

$$\Delta I_i(x, y) = (C_L 0 * R_{L\_const} + C_L 1 * R_{L\_const} + C_L 2 * R_{L\_const} +$$
$$C_L 3 * R_{L\_const} + C_L 4 * R_{L\_const} + C_L 5 * R_{L\_const} + C_L 6 * R_{L\_const} +$$
$$C_L 7 * R_{L\_const} + 2^{shiftFactor-1}) \gg shiftFactor =$$
$$(C_{L\_sum} * R_{L\_const} + 2^{shiftFactor-1}) \gg shiftFactor$$

If the $C_{L\_sum}=0$, $\Delta I_i(x,y)=0$, in this case, it will not do any correction to the current chroma sample.

Otherwise, due to the clip of $C_L 2$ to be equal to −32 or 31, $\Delta I_i(x,y) \neq 0$, in this case, it will change the average chroma sample values in the local area in the current picture, which is a strong artifact that reduce the subjective quality of a decoded picture. What is worse is that this average value cannot be compensated for, since the chroma residual (which can contain an average value correction) happens before the CC-ALF processing. Therefore, it is likely going to cause a lasting artifact in the chroma channel. If such a design is used it would be desirable for the encoder to avoid this situation by checking for it and then changing some of the other coefficient values so that $C_{L\_sum}$ becomes zero. This is the same thing as making sure that the value $C_L 2=(-1)*(C_L 0+C_L 1+C_L 2+C_L 3+C_L 4+C_L 5+C_L 6+C_L 7)$ stays within the allowed range [−32, 32]. However, that is extra work for the encoder.

In one embodiment, the derivation of the residual correction $\Delta I_i(x,y)$ is improved as follows:

$$\Delta I_i(x, y) = (C_L 0 * (R_L(x_L, y_L - 1) - R_L(x_L, y_L)) + \quad \text{(Eqn 8)}$$
$$C_L 1 * (R_L(x_L - 1, y_L) - R_L(x_L, y_L)) +$$
$$C_L 3 * (R_L(x_L + 1, y_L) - R_L(x_L, y_L)) +$$
$$C_L 4 * (R_L(x_L - 1, y_L + 1) - R_L(x_L, y_L)) +$$
$$C_L 5 * (R_L(x_L, y_L + 1) - R_L(x_L, y_L)) +$$
$$C_L 6 * (R_L(x_L + 1, y_L + 1) - R_L(x_L, y_L)) +$$
$$C_L 7 * (R_L(x_L, y_L + 2) - R_L(x_L, y_L)) +$$
$$2^{shiftFactor-1}) \gg shiftFactor$$

This can be written using difference values, or delta values as $$\Delta I_i(x, y) = (C_L0 * \Delta R_L(x_L, y_L - 1) + \\ C_L1 * \Delta R_L(x_L - 1, y_L) + \\ C_L3 * \Delta R_L(x_L + 1, y_L) + \\ C_L4 * \Delta R_L(x_L - 1, y_L + 1) + \\ C_L5 * \Delta R_L(x_L, y_L + 1) + \\ C_L6 * \Delta R_L(x_L + 1, y_L + 1) + \\ C_L7 * \Delta R_L(x_L, y_L + 2) + 2^{shiftFactor-1}) \gg shiftFactor$$

(Eqn 8b)

where each delta value $\Delta R_L(a,b)$ is calculated as the luma value in position (a,b) minus the luma value in the $C_L2$ position $(x_L, y_L)$. As an example, the delta value $\Delta R_L(x_L, y_L+1) = (R_L (x_L, y_L+1) R_L (x_L, y_L)$.

By this improved derivation of the residual correction $\Delta I_i(x,y)$, in a very flat local area where all luma reconstructed samples have the same sample value $R_{L\_const}$, the residual correction is guaranteed to be $\Delta I_i(x,y)=0$. The filtered chroma sample value $R_C^F(x_C, y_C)$ is then calculated from the residual correction value $\Delta I_i(x,y)$ and the unfiltered chroma sample value $R_C(x_C, y_C)$ using $$R_C^F(x_C, Y_C) = \Delta I_i(x_C, Y_C),$$ (Eqn 8c)

and this filtered value is then clipped to produce the final value. Another small advantage is that the number of CC-ALF coefficients is reduced from 8 to 7 to be signaled in the bitstream. Another way to reduce the number of coefficients signaled is to use the calculation of $C_L2$ in the same way as the anchor, i.e., $C_L2=\text{clip}(-32, 31, (-1)*(C_L0+C_L1+C_L3+C_L4+C_L5+C_L6+C_L7))$, but then simply avoid transmitting $C_L2$. This decoder will have to use the formula to recover $C_L2$. This will solve the problem of transmitting more than 7 coefficients, but it will not solve the problem of having $C_{L\_sum} \neq 0$.

In essence, the core idea in this embodiment is to obtain a first luma value $R_L(x_L, y_L)$ and at least two other luma values (for instance $R_L (x_L-1, y_L)$ and $R_L(x_L, y_L-1)$). At least two delta values are obtained by subtracting the first luma value from other values, for instance $\Delta R_L(X_L-1, Y_L) = (R_L (X_L-1, Y_L)-R_L (x_L, Y_L)$ and $\Delta R_L (x_L, Y_L-1) = (R_L (x_L, Y_L-1)-R_L (x_L, y_L)$. A residual correction value $\Delta I_i(x,y)$ is then calculated using the at least two delta values and coefficient values. Finally, a filtered chroma value $R_C^F(x_C, y_C)$ is calculated by adding the residual correction value $\Delta I_i(x,y)$ to the unfiltered chroma sample value $R_C(x_C, y_C)$ as $R_C^F(x_C, y_C) = \Delta I_i(x,y) + R_C(x_C, y_C)$.

5. Changing the Representation of Filter Coefficients

Several variants of the improved low complexity CC-ALF are described. This description uses the CE5-2.2 as anchor to show the BD-rate improvement. Given a dynamic range of the coefficient [min value, max value], in each of the proposed method, the CC-ALF coefficient can take any value from a set $Z_{sub} = \{Z_{two}^M, Z_{ext}\}$, where:

$Z_{ext}$ is a subset of $Z_{nopot}^M$, where $Z_{nopot}^M$ is defined above. As an example, $Z_{nopot}^{32} = \{-31, -30, -28, -24, -20, -18, -17, -15, -14, -12, -10, -9, -7, -6, -5, -3, 3, 5, 6, 7, 9, 10, 12, 14, 15, 17, 18, 20, 24, 28, 30, 31\}$, and an example of $Z_{ext}$ would be a subset thereof, for instance $Z_{ext} = \{-24, -12, -6, -3, 3, 6, 12, 24\}$.

In other words, at least one value in $Z_{sub}$ belongs to the set $Z_{ext}$.

5.1 Dynamic Range [−8, 8], $Z_{ext} = [−6, −3, 3, 6]$, Signal 7 CC-ALF Coefficients In this embodiment, the dynamic range is same as the CE5-2.2 to be [−8, 8]. $Z_{sub} = \{Z_{two}^8, Z_{ext}\}$, and $Z_{ext} = \{-6, -3, 3, 6\}$. Compared to CE5-2.2 where the CC-ALF coefficient has a value that from a set $\{-8, -4, -2, -1, 0, 1, 2, 4, 8\}$, the CC-ALF coefficient extended to have a value that from a set $\{-8, -6, -4, -3, -2, -1, 0, 1, 2, 3, 4, 6, 8\}$. In this embodiment, a CC-ALF coefficient can be written to can be written to 0 or $\pm 2^n$ or $\pm(2^n+2^{n-1})$.

In this embodiment, we use the improved derivation of the residual correction $\Delta I_i(x,y)$ as described herein, therefore, 7 CC-ALF coefficients are signaled in the bitstream.

The coefficient signaling in this embodiment uses truncated binary coding for the index of the magnitude of the coefficient followed by one-bit sign coding if the coefficient magnitude value is greater than 0. Table 4 shows the binarization of the coefficient signaling in this embodiment:

TABLE 4

In one embodiment, the coefficients are encoded using TB coding.

| magnitude | index | index bits | sign bit |
|---|---|---|---|
| 0 | 0 | 00 | |
| 1 | 1 | 010 | 0/1 |
| 2 | 2 | 011 | 0/1 |
| 3 | 3 | 100 | 0/1 |
| 4 | 4 | 101 | 0/1 |
| 6 | 5 | 110 | 0/1 |
| 8 | 6 | 111 | 0/1 |

Compared to CE5-2.2, we get the following BD-rate numbers:

| | Y | U | V | YUV |
|---|---|---|---|---|
| All intra | 0.01% | −0.65% | −0.71% | −0.13% |
| Random Access | 0.00% | −0.47% | −0.54% | −0.10% |
| Low delay B | | | | |

Compared to CE anchor, we get the following BD-rate numbers:

| | Y | U | V | YUV |
|---|---|---|---|---|
| All intra | −0.02% | 0.08% | −0.12% | −0.02% |
| Random Access | 0.00% | −0.13% | −0.11% | −0.02% |
| Low delay B | | | | |

5.2 Dynamic Range [−8, 8], $Z_{ext} = [−6, −3, 3, 6]$, Signal 8 CC-ALF Coefficients In this embodiment of, the dynamic range is same as the CE5-2.2 to be [−8, 8]. $Z_{sub} = \{Z_{two}^8, Z_{ext}\}$, and $Z_{ext} = \{-6, -3, 3, 6\}$. Compared to CE5-2.2 where the CC-ALF coefficient has a value that from a set $\{-8, -4, -2, -1, 0, 1, 2, 4, 8\}$, the CC-ALF coefficient extended to have a value that from a set $Z_{sub} = \{-8, -6, -4, -3, -2, -1, 0, 1, 2, 3, 4, 6, 8\}$. In this embodiment, a CC-ALF coefficient can be written to can be written to 0 or $\pm 2^n$ or $\pm(2^n+2^{n-1})$.

In this embodiment, we use the same derivation process of the residual correction $\Delta I_i(x,y)$ as CE5-2.2, therefore, 8 CC-ALF coefficients are signaled in the bitstream. Since we have restricted the CC-ALF coefficient to have a value that from a set, it should be noticed that there is a difference compared to the CE anchor which has 7 coefficients that are trained in the encoder side and one coefficient $C_L2$ is derived by $C_L2=(-1)*(C_L0+C_L1+C_L3+C_L4+C_L5+C_L6+C_L7)$ with clip to a value range between [−32, 31], inclusive. This would give a coefficient value that may not from the set $Z_{sub}$.

Therefore, in this embodiment, all 8 CC-ALF coefficients are trained in the encoder side to be sure that the coefficient value is from the set $Z_{sub}$.

The coefficient signaling in this embodiment uses truncated binary coding for the index of the magnitude of the coefficient followed by one-bit sign coding if the coefficient magnitude value is greater than 0. Table 5 shows the binarization of the coefficient signaling in this embodiment:

TABLE 5

In one embodiment, the coefficients are encoded using TB coding.

| magnitude | index | index bits | sign bit |
|---|---|---|---|
| 0 | 0 | 00 | |
| 1 | 1 | 010 | 0/1 |
| 2 | 2 | 011 | 0/1 |
| 3 | 3 | 100 | 0/1 |
| 4 | 4 | 101 | 0/1 |
| 6 | 5 | 110 | 0/1 |
| 8 | 6 | 111 | 0/1 |

Compared to CE5-2.2, we get the following BD-rate numbers:

| | Y | U | V | YUV |
|---|---|---|---|---|
| All intra | 0.01% | −0.31% | −0.21% | −0.05% |
| Random Access | | | | |
| Low delay B | | | | |

Compared to CE anchor, we get the following BD-rate numbers:

| | Y | U | V | YUV |
|---|---|---|---|---|
| All intra | −0.02% | 0.43% | 0.39% | 0.06% |
| Random Access | | | | |
| Low delay B | | | | |

5.3 Dynamic Range [−32, 32], $Z_{ext}$=[−24, −12, −6, −3, 3, 612, 24], Signal 7 CC-ALF Coefficients In this embodiment, the dynamic range is same as the CE anchor to be [−32, 32]. $Z_{sub}=\{Z_{two}^{32}, Z_{ext}\}$, and $Z_{ext}=\{-24, -12, -6, -3, 3, 6, 12, 24\}$. Compared to CE5-2.2 where the CC-ALF coefficient has a value that from a set $\{-8, -4, -2, -1, 0, 1, 2, 4, 8\}$, the CC-ALF coefficient extended to have a value that from a set $\{-32, -24, -16, -12, -8, -6, -4, -3, -2, -1, 0, 1, 2, 3, 4, 6, 8, 12, 16, 24, 32\}$. In this embodiment, a CC-ALF coefficient can be written to can be written to 0 or $\pm 2^n$ or $\pm(2^n \pm 2^{n-1})$.

In this embodiment, we use the improved derivation of the residual correction $\Delta I_i(x,y)$ as described in 5.2, therefore, 7 CC-ALF coefficients are signaled in the bitstream.

The coefficient signaling in this embodiment uses truncated binary coding for the index of the magnitude of the coefficient followed by one-bit sign coding if the coefficient magnitude value is greater than 0. Table 6 shows the binarization of the coefficient signaling in this embodiment:

TABLE 6

In one embodiment, the coefficients are encoded using TB coding.

| magnitude | index | index bits | sign bit |
|---|---|---|---|
| 0 | 0 | 000 | |
| 1 | 1 | 001 | 0/1 |
| 2 | 2 | 010 | 0/1 |
| 3 | 3 | 011 | 0/1 |
| 4 | 4 | 100 | 0/1 |
| 6 | 5 | 1010 | 0/1 |
| 8 | 6 | 1011 | 0/1 |
| 12 | 7 | 1100 | 0/1 |
| 16 | 8 | 1101 | 0/1 |
| 24 | 9 | 1110 | 0/1 |
| 32 | 10 | 1111 | 0/1 |

Compared to CE5-2.2 we get the following BD-rate numbers:

| | Y | U | V | YUV |
|---|---|---|---|---|
| All intra | 0.01% | −0.83% | −0.87% | −0.16% |
| Random Access | −0.01% | −0.63% | −0.75% | −0.15% |
| Low delay B | | | | |

Compared to CE anchor, we get the following BD-rate numbers:

| | Y | U | V | YUV |
|---|---|---|---|---|
| All intra | −0.02% | −0.09% | −0.28% | −0.05% |
| Random Access | −0.01% | −0.29% | −0.32% | −0.07% |
| Low delay B | | | | |

5.4 Dynamic Range [−32, 32], $Z_{ext}=\{-24, -20, -12, -10, -6, -5, -3, 3, 5, 6, 10, 12, 20, 24\}$, Signal 7 CC-ALF Coefficients In this embodiment of, the dynamic range is same as the CE anchor to be [−32, 32]. $Z_{sub}=\{Z_{two}^{32}, Z_{ext}\}$, and $Z_{ext}=\{-24, -12, -10, -6, -5, -3, 3, 5, 6, 10, 12, 24\}$. Compared to CE5-2.2 where the CC-ALF coefficient has a value that from a set $\{-8, -4, -2, -1, 0, 1, 2, 4, 8\}$, the CC-ALF coefficient extended to have a value that from a set $\{-32, -24, -20, -16, -12, -10, -8, -6, -5, -4, -3, -2, -1, 0, 1, 2, 3, 4, 5, 6, 8, 10, 12, 16, 20, 24, 32\}$. In this embodiment, a CC-ALF coefficient can be written to can be written to 0 or $\pm 2^n$ or $\pm(2^n+2^{n-1-})$ or $\pm(2^n+2^{n-2})$.

In this embodiment, we use the improved derivation of the residual correction $\Delta I_i(x,y)$ as described in 5.2, therefore, 7 CC-ALF coefficients are signaled in the bitstream.

The coefficient signaling in this embodiment uses truncated binary coding for the index of the magnitude of the coefficient followed by one-bit sign coding if the coefficient magnitude value is greater than 0. Table 7 shows the binarization of the coefficient signaling in this embodiment:

TABLE 7

In one embodiment, the coefficients are encoded using TB coding.

| magnitude | index | index bits | sign bit |
|---|---|---|---|
| 0 | 0 | 000 | |
| 1 | 1 | 001 | 0/1 |
| 2 | 2 | 0100 | 0/1 |
| 3 | 3 | 0101 | 0/1 |
| 4 | 4 | 0110 | 0/1 |
| 5 | 5 | 0111 | 0/1 |
| 6 | 6 | 1000 | 0/1 |

TABLE 7-continued

In one embodiment, the coefficients are encoded using TB coding.

| magnitude | index | index bits | sign bit |
|---|---|---|---|
| 8 | 7 | 1001 | 0/1 |
| 10 | 8 | 1010 | 0/1 |
| 12 | 9 | 1011 | 0/1 |
| 16 | 10 | 1100 | 0/1 |
| 20 | 11 | 1101 | 0/1 |
| 24 | 12 | 1110 | 0/1 |
| 32 | 13 | 1111 | 0/1 |

Compared to CE5-2.2 we get the following BD-rate numbers:

| | Y | U | V | YUV |
|---|---|---|---|---|
| All intra | 0.01% | −0.85% | −0.85% | −0.16% |
| Random Access | −0.01% | −0.63% | −0.75% | −0.15% |
| Low delay B | | | | |

Compared to CE anchor, we get the following BD-rate numbers:

| | Y | U | V | YUV |
|---|---|---|---|---|
| All intra | −0.02% | −0.11% | −0.26% | −0.05% |
| Random Access | −0.01% | −0.29% | −0.32% | −0.07% |
| Low delay B | | | | |

5.5 Using Signed Truncated Coding for the Coefficients

In some embodiments, it is possible to use signed truncated coding for the coefficients signaling. Table 8 shows an example of how the CC-ALF coefficients may be coded:

TABLE 8

Example of using signed truncated coding for the coefficients.

| coefficient | index | bit representation |
|---|---|---|
| 0 | 0 | 000 |
| −1 | 1 | 001 |
| 1 | 2 | 010 |
| −2 | 3 | 0110 |
| 2 | 4 | 0111 |
| −3 | 5 | 1000 |
| 3 | 6 | 1001 |
| −4 | 7 | 1010 |
| 4 | 8 | 1011 |
| −6 | 9 | 1100 |
| 6 | 10 | 1101 |
| −8 | 11 | 1110 |
| 8 | 12 | 1111 |

The coefficients could be recovered using the following pseudo-code:

```
char magtab[7] = { 0, 1, 2, 3, 4, 6, 8 };
xReadTruncBinCode(index, 13);    // read index
sign = (−1) * (index & 1);
magnitude = (index+1) >> 1;
coefficient = sign*magtab[magnitude].
```

5.6 Using Fix Length Coding for the Coefficients

In some embodiments it is possible to use fix length coding for the index of the magnitude of the coefficient followed by one-bit sign. Table 9 shows an example of how the CC-ALF coefficients in one embodiment may be coded:

TABLE 9

Example of using fix length coding for the coefficients.

| magnitude | index | index bits | sign bit |
|---|---|---|---|
| 0 | 0 | 000 | |
| 1 | 1 | 001 | 0/1 |
| 2 | 2 | 010 | 0/1 |
| 3 | 3 | 011 | 0/1 |
| 4 | 4 | 100 | 0/1 |
| 6 | 5 | 101 | 0/1 |
| 8 | 6 | 110 | 0/1 |

It is noticed that one bit increases for coding the index 0. However, the fix length coding may be more efficient than truncated binary coding in term of parsing/decoding bitstream.

Another example to use all the capacity of 3-bits fix length coding for the index of the magnitude of the coefficient. Instead of setting the dynamic range to be [−8, 8], we set the CC-ALF coefficient dynamic range to be [−12, 12]. Therefore, the CC-ALF coefficient extended to have a value that from a set {−12, −8, −6, −4, −3, −2, −1, 0, 1, 2, 3, 4, 6, 8, 12}. Table 10 shows an example of how the CC-ALF coefficient may be coded:

TABLE 10

Example of using all capacity of 3-bits fix length coding for the coefficients

| magnitude | index | index bits | sign bit |
|---|---|---|---|
| 0 | 0 | 000 | |
| 1 | 1 | 001 | 0/1 |
| 2 | 2 | 010 | 0/1 |
| 3 | 3 | 011 | 0/1 |
| 4 | 4 | 100 | 0/1 |
| 6 | 5 | 101 | 0/1 |
| 8 | 6 | 110 | 0/1 |
| 12 | 7 | 111 | 0/1 |

Figure 16:
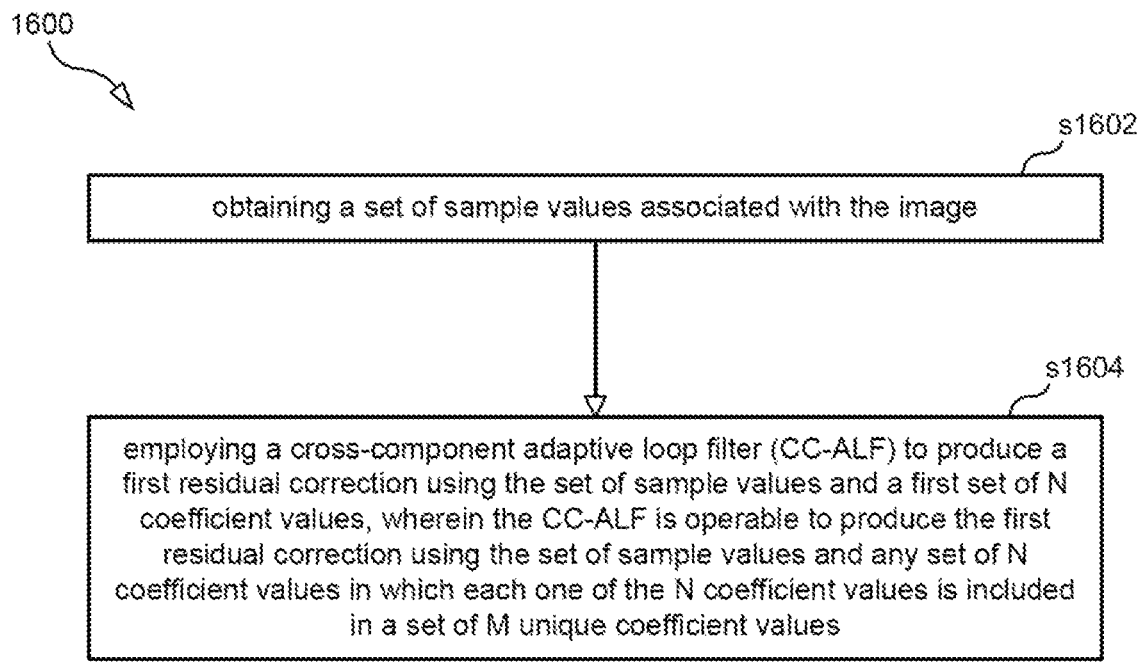
FIG. 16 is a flowchart illustrating a process according to an embodiment.

FIG. 16 is a flowchart illustrating a process 1600, according to an embodiment, for decoding an image. Process 1600 may begin in step s1602.

Step s1602 comprises obtaining a set of sample values associated with the image.

Step s1604 comprises employing a cross-component adaptive loop filter (CC-ALF) to produce a first residual correction using the set of sample values and a first set of N coefficient values, wherein the CC-ALF is operable to produce the first residual correction using the set of sample values and any set of N coefficient values in which each one of the N coefficient values is included in a set of M unique coefficient values, wherein N is greater than 1 and M is greater than 1 and further wherein i) the set of M unique coefficient values consists of the following unique values or consists of a subset of the following unique values: +/−0, 1, 2, 3, 4, 5, 6, 7, 8, 9, 10, 12, 14, 15, 16, 17, 18, 20, 24, 28, 30, 31, 32, 33, 34, 36, 40, 48, 56, 60, 62, 63, 64, 65, 66, 68, 72, 80, 96, 112, 120, 124, 126, 127, or 128 (i.e., Z+128) and ii) the set of M unique coefficient values includes at least one of the following values: +/−3, 5, 6, 7, 9, 10, 12, 14, 15, 17, 18, 20, 24, 28, 30, 31, 33, 34, 36, 40, 48, 56, 60, 62, 63, 65, 66, 68, 72, 80, 96, 112, 120, 124, 126, or 127.

Employing the CC-ALF to produce the first residual correcting comprises the steps of: a) obtaining the first set of N coefficient values and b) using the CC-ALF to calculate the first residual correction using the obtained first set of N coefficient values and the set of sample values, thereby producing the first residual correction. Each coefficient value included in the obtained first set of N coefficient values is constrained such that the coefficient value must be equal to one of the values included in the set of M unique values.

Figure 17:
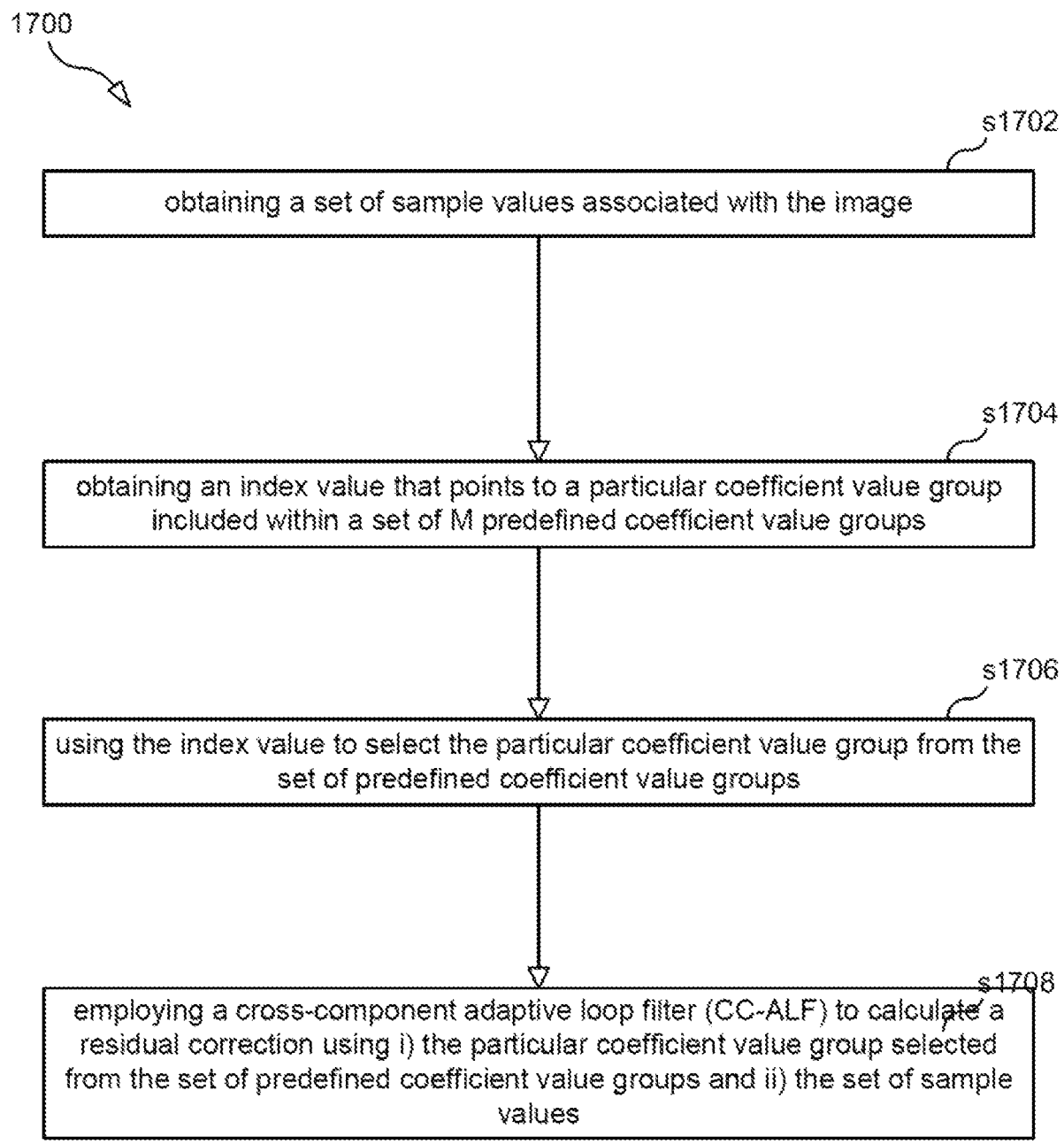
FIG. 17 is a flowchart illustrating a process according to an embodiment.

FIG. 17 is a flowchart illustrating a process 1700, according to an embodiment, for decoding an image. Process 1700 may begin in step s1702.

Step s1702 comprises obtaining a set of sample values associated with the image.

Step s1704 comprises obtaining an index value that points to a particular coefficient value group included within a set of M predefined coefficient value groups (e.g., M=64), wherein each coefficient value group included in the set of predefined coefficient value groups consists of N coefficient values, N being greater than 1, and further wherein: i) for each coefficient value group included in the set of predefined coefficient value groups, each coefficient value included in the coefficient group is constrained such that the coefficient value must be equal to one of the following values: +/−0, 1, 2, 3, 4, 5, 6, 7, 8, 9, 10, 12, 14, 15, 16, 17, 18, 20, 24, 28, 30, 31, 32, 33, 34, 36, 40, 48, 56, 60, 62, 63, 64, 65, 66, 68, 72, 80, 96, 112, 120, 124, 126, 127, or 128 and ii) for at least one coefficient value group included in the set of predefined coefficient value groups, at least one of the coefficient values included in said at least one coefficient value group is equal to one of the following values: +/−3, 5, 6, 7, 9, 10, 12, 14, 15, 17, 18, 20, 24, 28, 30, 31, 33, 34, 36, 40, 48, 56, 60, 62, 63, 65, 66, 68, 72, 80, 96, 112, 120, 124, 126, or 127.

Step s1706 comprises using the index value to select the particular coefficient value group from the set of predefined coefficient value groups.

Step s1708 comprises employing a cross-component adaptive loop filter (CC-ALF) to calculate a residual correction using i) the particular coefficient value group selected from the set of predefined coefficient value groups and ii) the set of sample values.

Figure 18:
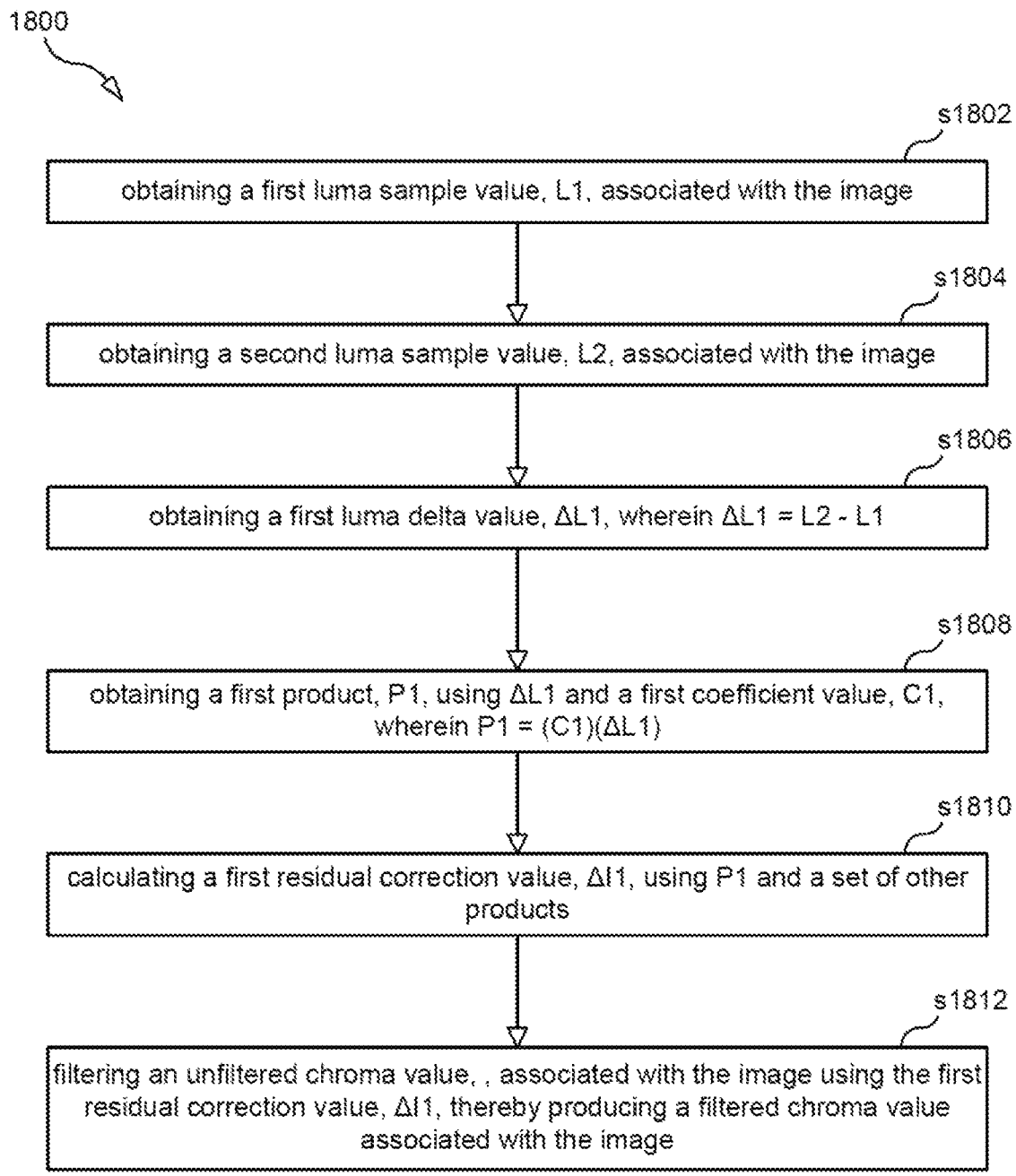
FIG. 18 is a flowchart illustrating a process according to an embodiment.

FIG. 18 is a flowchart illustrating a process 1800, according to an embodiment, for decoding an image. Process 1800 may begin in step s1802. Step s1802 comprises obtaining a first luma sample value, L1, associated with the image. Step s1804 comprises obtaining a second luma sample value, L2, associated with the image. Step s1806 comprises obtaining a first luma delta value, $\Delta L1$, wherein $\Delta L1=L2-L1$. Step s1808 comprises obtaining a first product, P1, using $\Delta L1$ and a first coefficient value, C1, wherein $P1=(C1)(\Delta L1)$. There are a variety of way in which P1 may be obtained. For example, in one embodiment, if C1 is a power of two, then P1 may be obtained by bit shifting $\Delta L1$ based on C1. In another embodiment, if $C1=3*2^n$, then P1 may be obtained by adding a shifted version of the delta value to itself and then shift the result. In yet another embodiment, P1 may be obtained by multiplying C1 and $\Delta L1$. Step s1810 comprises calculating a first residual correction value, $\Delta I1$ using P1 and a set of other products. Step s1812 comprises filtering an unfiltered chroma value, $R_C$, associated with the image using the first residual correction value, $\Delta I1$ thereby producing a filtered chroma value $R_C^F$ associated with the image.

In some embodiments, filtering the unfiltered chroma value to produce the filtered chroma value consists of calculating: $R_C^F=\Delta I1+R_C$.

In some embodiments, the set of other products comprises a second product, P2, $P2=(C2)(\Delta L2)$, C2 is a second coefficient value, $\Delta L2$ is a second luma delta value that is equal to $L3-L1$, and L3 is a third luma sample value associated with the image.

In some embodiments, L1 has a first position within a two-dimensional block of luma sample values associated with the image, wherein the coordinates of the first position are x1,y1, L2 has a second position within the two-dimensional block of luma sample values, wherein the coordinates of the second position are x2,y2, the absolute value of (x1-x2) is less than or equal to 4, and the absolute value of (y1-y2) is less than or equal to 4.

In some embodiments, the absolute value of (x1-x2) is less than or equal to 2, and the absolute value of (y1-y2) is less than or equal to 2.

In some embodiments, $R_C$ has a position within a two-dimensional block of chroma sample values associated with the image, where the coordinates of the position are xc,yc; L1 has a first position within a two-dimensional block of luma sample values associated with the image, wherein the coordinates of the first position are x1,y1; L2 has a second position within the two-dimensional block of luma sample values, wherein the coordinates of the second position are x2,y2; and the second position is obtained from the position of $R_C$ within the two-dimensional block of chroma sample values.

In some embodiments, x2=(Wc)(xc); y2=(Hc)(yc); Wc is a first predetermined coefficient that is based on the format of the image; and Hc is a second predetermined coefficient that is based on the format of the image.

In some embodiments, when the format of the image is 4:2:0, Wc=Hc=2; when the format of the image is 4:2:2, Wc=2 and Hc=1; and when the format of the image is 4:4:4, Wc=Hc=1.

Figure 20:
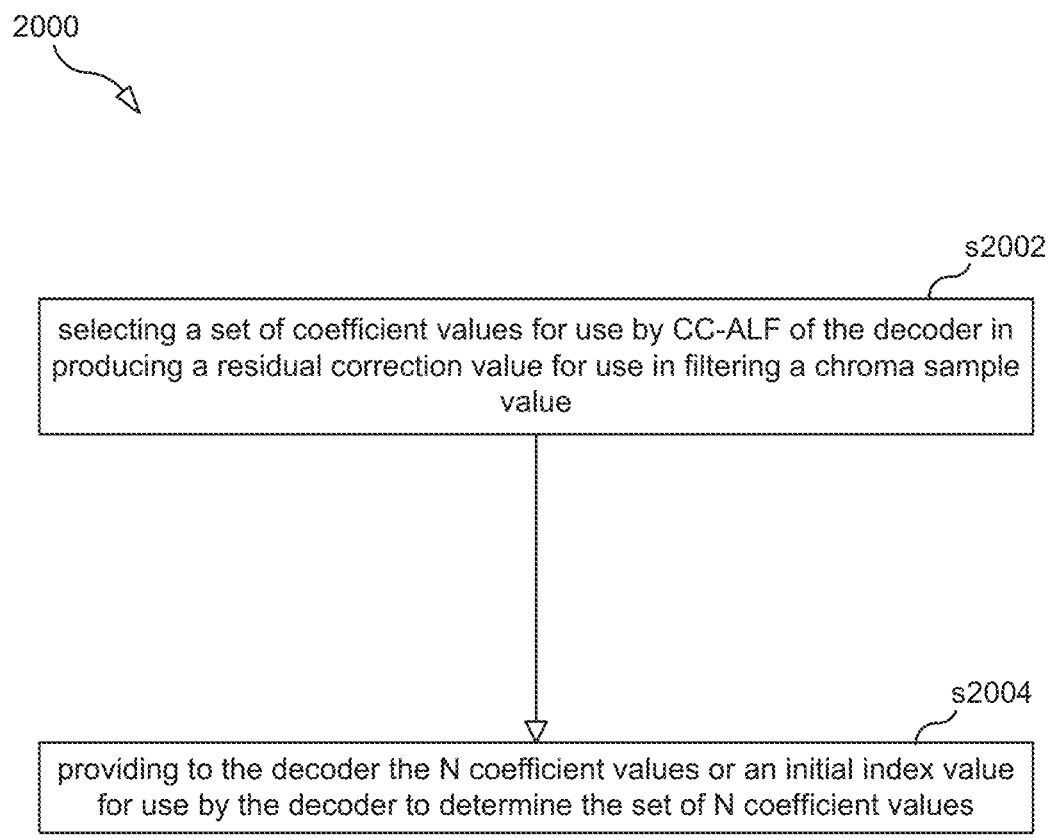
FIG. 20 is a flowchart illustrating a process according to an embodiment.

FIG. 20 is a flow chart illustrating a process 2000, according to one embodiment, that is performed by encoder 302. Process 2000 may begin in steps s2002.

Step s2002 comprises the encoder selecting a set of coefficient values for use by the CC-ALF of decoder 504 in producing a residual correction value for use in filtering a chroma sample value, the selected set of coefficient values consisting of N coefficient values. Each one of the N coefficient values is included in a set of M unique coefficient values, wherein N is greater than 1 and M is greater than 1 and further wherein i) the set of M unique coefficient values consists of the following unique values or consists of a subset of the following unique values: +/−0, 1, 2, 3, 4, 5, 6, 7, 8, 9, 10, 12, 14, 15, 16, 17, 18, 20, 24, 28, 30, 31, 32, 33, 34, 36, 40, 48, 56, 60, 62, 63, 64, 65, 66, 68, 72, 80, 96, 112, 120, 124, 126, 127, or 128 (i.e., Z+128) and ii) the set of M unique coefficient values includes at least one of the following values: +/−3, 5, 6, 7, 9, 10, 12, 14, 15, 17, 18, 20, 24, 28, 30, 31, 33, 34, 36, 40, 48, 56, 60, 62, 63, 65, 66, 68, 72, 80, 96, 112, 120, 124, 126, or 127, and each coefficient value included in the set of N coefficient values is constrained such that the coefficient value must be equal to one of the values included in the set of M unique values.

Step s2004 comprises the encoder providing to decoder 504 the N coefficient values or an index value for use by the decode to determine the set of N coefficient values.

Figure 19:
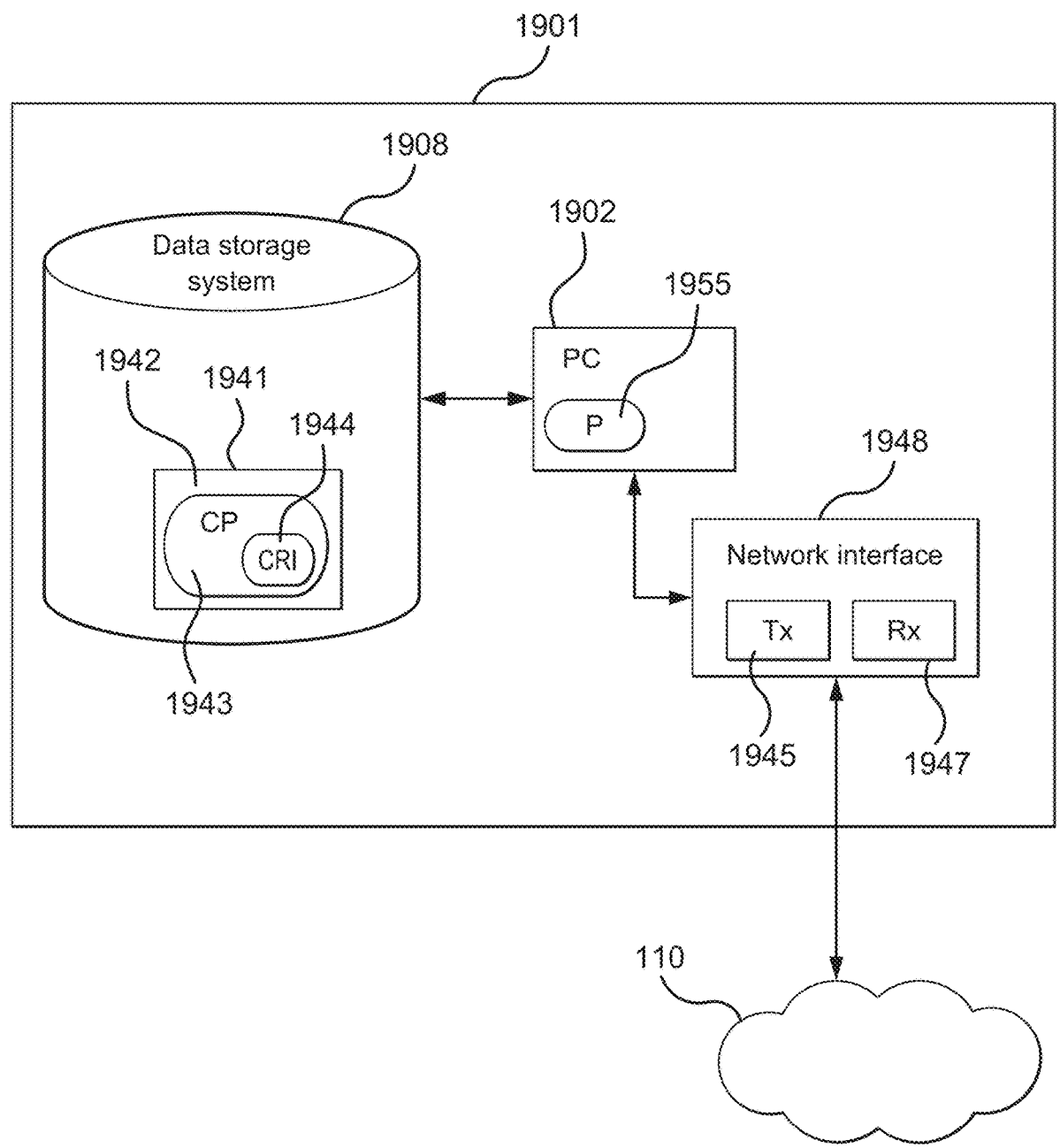
FIG. 19 is a block diagram of an apparatus 1901 for implementing encoder 502 or decoder 504, according to some embodiments.

FIG. 19 is a block diagram of an apparatus 1901 for implementing encoder 502 or decoder 504, according to some embodiments. That is, apparatus 1901 can be adapted to perform the methods disclosed herein. In embodiments where apparatus 1901 implements encoder 502, apparatus 1901 may be referred to as "encoding apparatus 1901," and in embodiments where apparatus 1901 implements decoder 504, apparatus 1901 may be referred to as a "decoding apparatus 1901." As shown in FIG. 19, apparatus 1901 may comprise: processing circuitry (PC) 1902, which may include one or more processors (P) 1955 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; one or more network interfaces 1948 (which may be co-located or geographically distributed) where each network interface includes a transmitter (Tx) 1945 and a receiver (Rx) 1947 for enabling apparatus 1901 to transmit data to and receive data from other nodes connected to network 110 (e.g., an Internet Protocol (IP) network) to which network interface 1948 is connected; and one or more storage units (a.k.a., "data storage systems") 1908 which may be co-located or geographically distributed and which may include one or more non-volatile storage devices and/or one or more volatile storage devices. In embodiments where PC 1902 includes a programmable processor, a computer program product (CPP) 1941 may be provided. CPP 1941 includes a computer readable medium (CRM) 1942 storing a computer program (CP) 1943 comprising computer readable instructions (CRI) 1944. CRM 1942 may be a non-transitory computer readable medium, such as, magnetic media (e.g., a hard disk), optical media, memory devices (e.g., random access memory, flash memory), and the like. In some embodiments, the CRI 1944 of computer program 1943 is adapted such that when executed by PC 1902, the CRI causes apparatus 1901 to perform steps described herein (e.g., steps described herein with reference to the flow charts). In other embodiments, apparatus 1901 may be adapted to perform steps described herein without the need for code. That is, for example, PC 1902 may consist merely of one or more ASICs. Hence, the features of the embodiments described herein may be implemented in hardware and/or software.

REFERENCES

[1] Misra, et al., "Cross-Component Adaptive Loop Filter for chroma," JVET-00636 r1, July 2019 (available at URL=phenix.it-sudparis.eu/jvet/doc end user/documents/15_Gothenburg/wg11/JVET-00636-v2.zip)

[2] Chen, "Description of Core Experiment 5 (CE5): Cross-component adaptive loop filtering," JVET-P2025-v4, October 2019 (available at URL=phenix.it-sudparis.eu/jvet/doc_end_user/documents/16_Geneva/wg11/JVET-P2025-v4.zip)

Annex A

Proposed Changes to VVC Draft Text

The section below illustrates example proposed changes to the current CC-ALF modified VVC draft text (ref CCALF-Text-NET-P1008-v2-over-NET-02001-vE) for the improved low complexity CC-ALF process for one embodiment.
Start changes
7.2 Specification of Syntax Functions and Descriptors The functions presented here are used in the syntactical description. These functions are expressed in terms of the value of a bitstream pointer that indicates the position of the next bit to be read by the decoding process from the bitstream.

byte_aligned( ) is specified as follows:
If the current position in the bitstream is on a byte boundary, i.e., the next bit in the bitstream is the first bit in a byte, the return value of byte_aligned( ) is equal to TRUE.
Otherwise, the return value of byte_aligned( ) is equal to FALSE.

more_data_in_byte_stream( ) which is used only in the byte stream NAL unit syntax structure specified in Annex B, is specified as follows:
If more data follow in the byte stream, the return value of more_data_in_byte_stream( ) is equal to TRUE.
Otherwise, the return value of more_data_in_byte_stream( ) is equal to FALSE.
more_data_in_payload( ) is specified as follows:
If byte_aligned( ) is equal to TRUE and the current position in the sei_payload( ) syntax structure is 8* payloadSize bits from the beginning of the sei_payload( )) syntax structure, the return value of more_data_in_payload( ) is equal to FALSE.
Otherwise, the return value of more_data_in_payload( ) is equal to TRUE. more_rbsp_data( ) is specified as follows:
If there is no more data in the raw byte sequence payload (RBSP), the return value of more_rbsp_data( ) is equal to FALSE.
Otherwise, the RBSP data are searched for the last (least significant, right-most) bit equal to 1 that is present in the RBSP. Given the position of this bit, which is the first bit (rbsp_stop_one_bit) of the rbsp_trailing_bits( ) syntax structure, the following applies:
If there is more data in an RBSP before the rbsp_trailing_bits( ) syntax structure, the return value of more_rbsp_data( ) is equal to TRUE.
Otherwise, the return value of more_rbsp_data( ) is equal to FALSE.
The method for enabling determination of whether there is more data in the RBSP is specified by the application (or in Annex B for applications that use the byte stream format).
more_rbsp_trailing_data( ) is specified as follows:
If there is more data in an RBSP, the return value of more_rbsp_trailing_data( ) is equal to TRUE.
Otherwise, the return value of more_rbsp_trailing_data( ) is equal to FALSE.
next_bits(n) provides the next bits in the bitstream for comparison purposes, without advancing the bitstream pointer. Provides a look at the next n bits in the bitstream with n being its argument. When used within the byte stream format as specified in Annex B and fewer than n bits remain within the byte stream, next_bits(n) returns a value of 0.
payload_extension_presenft) is specified as follows:
If the current position in the sei_payload( ) syntax structure is not the position of the last (least significant, right-most) bit that is equal to 1 that is less than 8* payloadSize bits from the beginning of the syntax structure (i.e., the position of the payload_bit_equal_to_one syntax element), the return value of payload_extension_present( ) is equal to TRUE.
Otherwise, the return value of payload_extension_present( ) is equal to FALSE.
read_bits(n) reads the next n bits from the bitstream and advances the bitstream pointer by n bit positions. When n is equal to 0, read_bits(n) is specified to return a value equal to 0 and to not advance the bitstream pointer.
The following descriptors specify the parsing process of each syntax element:
ae(v): context-adaptive arithmetic entropy-coded syntax element. The parsing process for this descriptor is specified in clause 9.3.
b(8): byte having any pattern of bit string (8 bits). The parsing process for this descriptor is specified by the return value of the function read_bits(8).

f(n): fixed-pattern bit string using n bits written (from left to right) with the left bit first. The parsing process for this descriptor is specified by the return value of the function read_bits(n).

i(n): signed integer using n bits. When n is "v" in the syntax table, the number of bits varies in a manner dependent on the value of other syntax elements. The parsing process for this descriptor is specified by the return value of the function read_bits(n) interpreted as a two's complement integer representation with most significant bit written first.

se(v): signed integer 0-th order Exp-Golomb-coded syntax element with the left bit first. The parsing process for this descriptor is specified in clause 9.2 with the order k equal to 0.

u(n): unsigned integer using n bits. When n is "v" in the syntax table, the number of bits varies in a manner dependent on the value of other syntax elements. The parsing process for this descriptor is specified by the return value of the function read bits(n) interpreted as a binary representation of an unsigned integer with most significant bit written first.

ue(v): unsigned integer 0-th order Exp-Golomb-coded syntax element with the left bit first. The parsing process for this descriptor is specified in clause 9.2 with the order k equal to 0.

uek(v): unsigned integer k-th order Exp-Golomb-coded syntax element with the left bit first. The parsing process for this descriptor is specified in clause 9.2 with the order k defined in the semantics of the syntax element.

tb(v): truncated binary using up to maxVal bits with maxVal defined in the semantics of the syntax element. The parsing process for this descriptor is specified in clause 0.

7.3.2.14 Adaptive Loop Filter Data Syntax

| | Descriptor |
|---|---|
| alf_data( ) { | |
|   alf_luma_filter_signal_flag | u(1) |
|   alf_chroma_filter_signal_flag | u(1) |
|   alf_cross_component_cb_filter_signal_flag | u(1) |
|   alf_cross_component_cr_filter_signal_flag | u(1) |
|   if( alf_luma_filter_signal_flag ) { | |
|     alf_luma_clip_flag | u(1) |
|     alf_luma_num_filters_signalled_minus1 | ue(v) |
|     if( alf_luma_num_filters_signalled_minus1 > 0 ) { | |
|       for( filtIdx = 0; filtIdx < NumAlfFilters; filtIdx++ ) | |
|         alf_luma_coeff_delta_idx[ filtIdx ] | u(v) |
|     } | |
|     alf_luma_coeff_signalled_flag | u(1) |
|     if( alf_luma_coeff_signalled_flag ) { | |
|       for( sfIdx = 0; sfIdx <= alf_luma_num_filters_signalled_minus1; sfIdx++ ) | |
|         alf_luma_coeff_flag[ sfIdx ] | u(1) |
|     } | |
|     for( sfIdx = 0; sfIdx <= alf_luma_num_filters_signalled_minus1; sfIdx++ ) { | |
|       if( alf_luma_coeff_flag[ sfIdx ] ) { | |
|         for ( j = 0; j < 12; j++ ) { | |
|           alf_luma_coeff_abs[ sfIdx ][ j ] | uek(v) |
|           if( alf_luma_coeff_abs[ sfIdx ][ j ] ) | |
|             alf_luma_coeff_sign[ sfIdx ][ j ] | u(1) |
|         } | |
|       } | |
|     } | |
|     if( alf_luma_clip_flag ) { | |
|       for( sfIdx = 0; sfIdx <= alf_luma_num_filters_signalled_minus1; sfIdx++ ) { | |
|         if( alf_luma_coeff_flag[ sfIdx ] ) { | |
|           for ( j = 0; j < 12; j++ ) | |
|             alf_luma_clip_idx[ sfIdx ][ j ] | u(2) |
|         } | |
|       } | |
|     } | |
|   } | |
|   if( alf_chroma_filter_signal_flag ) { | |
|     alf_chroma_num_alt_filters_minus1 | ue(v) |
|     for( altIdx = 0; altIdx <= alf_chroma_num_alt_filters_minus1; altIdx++ ) { | |
|       alf_chroma_clip_flag[ altIdx ] | u(1) |
|       for( j = 0; j < 6; j++ ) { | |
|         alf_chroma_coeff_abs[ altIdx ][ j ] | uek(v) |
|         if( alf_chroma_coeff_abs[ altIdx ][ j ] > 0 ) | |
|           alf_chroma_coeff_sign[ altIdx ][ j ] | u(1) |
|       } | |
|       if( alf_chroma_clip_flag[ altIdx ] ) { | |
|         for( j = 0; j < 6; j++ ) | |
|           alf_chroma_clip_idx[ altIdx ][ j ] | u(2) |
|       } | |
|     } | |
|   } | |
|   if ( alf_cross_component_cb_filter_signal_flag ) { | |
|     alf_cross_component_cb_filters_signalled_minus1 | ue(v) |
|     for( k = 0; k < (alf_cross_component_cb_filters_signalled_minus1+1); k++ ) { | |
|       ~~for ( j = 0; j < 8; j++ )~~ | |
|       for ( j = 0; j < 7; j++ ) { | |
|         ~~alf_cross_component_cb_coeff_plus32[ k ][ j ]~~ | ~~u(6)~~ |
|         alf_cross_component_cb_coeff_abs_idx[ k ][ j ] | tb(v) |
|         if (alf_cross_component_cb_coeff_abs_idx [ k ][ j ] >0 ) | |
|           alf_cross_component_cb_coeff_sign[ k ][ j ] | u(1) |
|       } | |
|     } | |
|   } | |
|   if ( alf_cross_component_cr_filter_signal_flag ) { | |
|     alf_cross_component_cr_filters_signalled_minus1 | ue(v) |
|     for( k = 0; k < (alf_cross_component_cr_filters_signalled_minus1+1); k++ ) { | |
|       ~~for ( j = 0; j < 8; j++ )~~ | |
|       for ( j = 0; j < 7; j++ ) { | |
|         ~~alf_cross_component_cb_coeff_plus32[ k ][ j ]~~ | ~~u(6)~~ |
|         alf_cross_component_cr_coeff_abs_idx[ k ][ j ] | tb(v) |
|         if (alf_cross_component_cr_coeff_abs_idx[ k ][ j ] > 0 ) | |
|           alf_cross_component_cr_coeff_sign[ k ][ j ] | u(1) |
|       } | |
|     } | |
|   } | |
| } | |

7.4.3.14 Adaptive Loop Filter Data Semantics alf luma_filter_signal_flag equal to 1 specifies that a luma filter set is signalled. alf_luma_filter_signal_flag equal to 0 specifies that a luma filter set is not signalled.

alf chroma_filter_signal_flag equal to 1 specifies that a chroma filter is signalled. alf_chroma_filter_signal_flag equal to 0 specifies that a chroma filter is not signalled. When ChromaArrayType is equal to 0, alf_chroma_filter_signal_flag shall be equal to 0.

The variable NumAlfFilters specifying the number of different adaptive loop filters is set equal to 25.

alf_luma_clip_flag equal to 0 specifies that linear adaptive loop filtering is applied on luma component. alf_luma_clip_flag equal to 1 specifies that non-linear adaptive loop filtering may be applied on luma component.

alf_luma_num_filters_signalled_minus1 plus 1 specifies the number of adpative loop filter classes for which luma coefficients can be signalled. The value of alf_luma_num_filters_signalled_minus1 shall be in the range of 0 to NumAlfFilters−1, inclusive.

alf_luma_coeff_delta_idx[filtIdx] specifies the indices of the signalled adaptive loop filter luma coefficient deltas for the filter class indicated by filtIdx ranging from 0 to NumAlfFilters−1. When alf_luma_coeff_delta_idx[filtIdx] is not present, it is inferred to be equal to 0. The length of alf_luma_coeff_delta_idx[filtIdx] is Ceil(Log 2(alf_luma_num_filters_signalled_minus1+1)) bits.

alf_luma_coeff_signalled_flag equal to 1 indicates that alf_luma_coeff flag[sfIdx] is signalled. alf_luma_coeff_signalled_flag equal to 0 indicates that alf_luma_coeff flag [sfIdx] is not signalled.

alf_luma_coeff_flag[sfIdx] equal 1 specifies that the coefficients of the luma filter indicated by sfIdx are signalled. alf_luma_coeff_flag[sfIdx] equal to 0 specifies that all filter coefficients of the luma filter indicated by sfIdx are set equal to 0. When not present, alf_luma_coeff_flag[sfIdx] is set equal to 1.

alf_luma_coeff_abs[sfIdx][j] specifies the absolute value of the j-th coefficient of the signalled luma filter indicated by sfIdx. When alf luma coeff_abs[sfIdx][j] is not present, it is inferred to be equal 0.

The order k of the exp-Golomb binarization uek(v) is set equal to 3.

alf_luma_coeff sign[sfIdx][j] specifies the sign of the j-th luma coefficient of the filter indicated by sfIdx as follows:

If alf_luma_coeff sign[sfIdx][j] is equal to 0, the corresponding luma filter coefficient has a positive value.

Otherwise (alf_luma_coeff sign[sfIdx][j] is equal to 1), the corresponding luma filter coefficient has a negative value.

When alf_luma_coeff_sign[sfIdx][j] is not present, it is inferred to be equal to 0.

The variable filtCoeff[sfIdx][j] with sfIdx=0 . . . alf_luma_num_filters_signalled_minus1, j=0 . . . 11 is initialized as follows:

$$\text{filtCoeff}[sfIdx][j] = \text{alf\_luma\_coeff\_abs}[sfIdx][j] * (1 - 2*\text{alf\_luma\_coeff\_sign}[sfIdx][j]) \quad (7\text{-}47)$$

The luma filter coefficients $\text{AlfCoeff}_L$ [adaptation_parameter_set_id] with elements $\text{AlfCoeff}_L$ [adaptation_parameter_set_id][filtIdx][j], with filtIdx=0 . . . NumAlffilters−1 and j=0 . . . 11 are derived as follows:

$$\text{AlfCoeff}_L[\text{adaptation\_parameter\_set\_id}][\text{filtIdx}][j] = \text{filtCoeff}[\text{alf\_luma\_coeff\_delta\_idx}[\text{filtIdx}]][j] \quad (7\text{-}48)$$

The fixed filter coefficients AlfFixFiltCoeff[i][j] with i=0.64, j=0.11 and the class to filter mapping AlfClassToFiltMap[m][n] with m=0.15 and n=0.24 are derived as follows:

```
AlfFixFiltCoeff =    (7-49)
{
  { 0, 0, 2, -3, 1, -4, 1, 7, -1, 1, -1, 5}
  { 0, 0, 0, 0, 0, -1, 0, 1, 0, 0, -1, 2}
  { 0, 0, 0, 0, 0, 0, 0, 1, 0, 0, 0, 0}
  { 0, 0, 0, 0, 0, 0, 0, 0, 0, 0, -1, 1}
  { 2, 2, -7, -3, 0, -5, 13, 22, 12, -3, -3, 17}
  {-1, 0, 6, -8, 1, -5, 1, 23, 0, 2, -5, 10}
  { 0, 0, -1, -1, 0, -1, 2, 1, 0, 0, -1, 4}
  { 0, 0, 3, -11, 1, 0, -1, 35, 5, 2, -9, 9}
  { 0, 0, 8, -8, -2, -7, 4, 4, 2, 1, -1, 25}
  { 0, 0, 1, -1, 0, -3, 1, 3, -1, 1, -1, 3}
  { 0, 0, 3, -3, 0, -6, 5, -1, 2, 1, -4, 21}
  {-7, 1, 5, 4, -3, 5, 11, 13, 12, -8, 11, 12}
  {-5, -3, 6, -2, -3, 8, 14, 15, 2, -7, 11, 16}
  { 2, -1, -6, -5, -2, -2, 20, 14, -4, 0, -3, 25}
  { 3, 1, -8, -4, 0, -8, 22, 5, -3, 2, -10, 29}
  { 2, 1, -7, -1, 2, -11, 23, -5, 0, 2, -10, 29}
  {-6, -3, 8, 9, -4, 8, 9, 7, 14, -2, 8, 9}
  { 2, 1, -4, -7, 0, -8, 17, 22, 1, -1, -4, 23}
  { 3, 0, -5, -7, 0, -7, 15, 18, -5, 0, -5, 27}
  { 2, 0, 0, -7, 1, -10, 13, 13, -4, 2, -7, 24}
  { 3, 3, -13, 4, -2, -5, 9, 21, 25, -2, -3, 12}
  {-5, -2, 7, -3, -7, 9, 8, 9, 16, -2, 15, 12}
  { 0, -1, 0, -7, -5, 4, 11, 11, 8, -6, 12, 21}
  { 3, -2, -3, -8, -4, -1, 16, 15, -2, -3, 3, 26}
  { 2, 1, -5, -4, -1, -8, 16, 4, -2, 1, -7, 33}
  { 2, 1, -4, -2, 1, -10, 17, -2, 0, 2, -11, 33}
  { 1, -2, 7, -15, -16, 10, 8, 8, 20, 11, 14, 11}
  { 2, 2, 3, -13, -13, 4, 8, 12, 2, -3, 16, 24}
  { 1, 4, 0, -7, -8, -4, 9, 9, -2, -2, 8, 29}
  { 1, 1, 2, -4, -1, -6, 6, 3, -1, -1, -3, 30}
  {-7, 3, 2, 10, -2, 3, 7, 11, 19, -7, 8, 10}
  { 0, -2, -5, -3, -2, 4, 20, 15, -1, -3, -1, 22}
  { 3, -1, -8, -4, -1, -4, 22, 8, -4, 2, -8, 28}
  { 0, 3, -14, 3, 0, 1, 19, 17, 8, -3, -7, 20}
  { 0, 2, -1, -8, 3, -6, 5, 21, 1, 1, -9, 13}
  {-4, -2, 8, 20, -2, 2, 3, 5, 21, 4, 6, 1}
  { 2, -2, -3, -9, -4, 2, 14, 16, 3, -6, 8, 24}
  { 2, 1, 5, -16, -7, 2, 3, 11, 15, -3, 11, 22}
  { 1, 2, 3, -11, -2, -5, 4, 8, 9, -3, -2, 26}
  { 0, -1, 10, -9, -1, -8, 2, 3, 4, 0, 0, 29}
  { 1, 2, 0, -5, 1, -9, 9, 3, 0, 1, -7, 20}
  {-2, 8, -6, -4, 3, -9, -8, 45, 14, 2, -13, 7}
  { 1, -1, 16, -19, -8, -4, -3, 2, 19, 0, 4, 30}
  { 1, 1, -3, 0, 2, -11, 15, -5, 1, 2, -9, 24}
  { 0, 1, -2, 0, 1, -4, 4, 0, 0, 1, -4, 7}
  { 0, 1, 2, -5, 1, -6, 4, 10, -2, 1, -4, 10}
```

-continued

```
  { 3, 0, -3, -6, -2, -6, 14, 8, -1, -1, -3, 31}
  { 0, 1, 0, -2, 1, -6, 5, 1, 0, 1, -5, 13}
  { 3, 1, 9, -19, -21, 9, 7, 6, 13, 5, 15, 21}
  { 2, 4, 3, -12, -13, 1, 7, 8, 3, 0, 12, 26}
  { 3, 1, -8, -2, 0, -6, 18, 2, -2, 3, -10, 23}
  { 1, 1, -4, -1, 1, -5, 8, 1, -1, 2, -5, 10}
  { 0, 1, -1, 0, 0, -2, 2, 0, 0, 1, -2, 3}
  { 1, 1, -2, -7, 1, -7, 14, 18, 0, 0, -7, 21}
  { 0, 1, 0, -2, 0, -7, 8, 1, -2, 0, -3, 24}
  { 0, 1, 1, -2, 2, -10, 10, 0, -2, 1, -7, 23}
  { 0, 2, 2, -11, 2, -4, -3, 39, 7, 1, -10, 9}
  { 1, 0, 13, -16, -5, -6, -1, 8, 6, 0, 6, 29}
  { 1, 3, 1, -6, -4, -7, 9, 6, -3, -2, 3, 33}
  { 4, 0, -17, -1, -1, 5, 26, 8, -2, 3, -15, 30}
  { 0, 1, -2, 0, 2, -8, 12, -6, 1, 1, -6, 16}
  { 0, 0, 0, -1, 1, -4, 4, 0, 0, 0, -3, 11}
  { 0, 1, 2, -8, 2, -6, 5, 15, 0, 2, -7, 9}
  { 1, -1, 12, -15, -7, -2, 3, 6, 6, -1, 7, 30}
},
AlfClassToFiltMap =    (7-50)
{
  { 8, 2, 2, 2, 3, 4, 53, 9, 9, 52, 4, 4, 5, 9, 2, 8, 10, 9, 1, 3, 39, 39, 10, 9, 52 }
  { 11, 12, 13, 14, 15, 30, 11, 17, 18, 19, 16, 20, 20, 4, 53, 21, 22, 23, 14, 25, 26, 26, 27, 28, 10 }
  { 16, 12, 31, 32, 14, 16, 30, 33, 53, 34, 35, 16, 20, 4, 7, 16, 21, 36, 18, 19, 21, 26, 37, 38, 39 }
  { 35, 11, 13, 14, 43, 35, 16, 4, 34, 62, 35, 35, 30, 56, 7, 35, 21, 38, 24, 40, 16, 21, 48, 57, 39 }
  { 11, 31, 32, 43, 44, 16, 4, 17, 34, 45, 30, 20, 20, 7, 5, 21, 22, 46, 40, 47, 26, 48, 63, 58, 10 }
  { 12, 13, 50, 51, 52, 11, 17, 53, 45, 9, 30, 4, 53, 19, 0, 22, 23, 25, 43, 44, 37, 27, 28, 10, 55 }
  { 30, 33, 62, 51, 44, 20, 41, 56, 34, 45, 20, 41, 41, 56, 5, 30, 56, 38, 40, 47, 11, 37, 42, 57, 8 }
  { 35, 11, 23, 32, 14, 35, 20, 4, 17, 18, 21, 20, 20, 20, 4, 16, 21, 36, 46, 25, 41, 26, 48, 49, 58 }
  { 12, 31, 59, 59, 3, 33, 33, 59, 59, 52, 4, 33, 17, 59, 55, 22, 36, 59, 59, 60, 22, 36, 59, 25, 55 }
  { 31, 25, 15, 60, 60, 22, 17, 19, 55, 55, 20, 20, 53, 19, 55, 22, 46, 25, 43, 60, 37, 28, 10, 55, 52}
  { 12, 31, 32, 50, 51, 11, 33, 53, 19, 45, 16, 4, 4, 53, 5, 22, 36, 18, 25, 43, 26, 27, 27, 28, 10 }
  { 5, 2, 44, 52, 3, 4, 53, 45, 9, 3, 4, 56, 5, 0, 2, 5, 10, 47, 52, 3, 63, 39, 10, 9, 52 }
  { 12, 34, 44, 44, 3, 56, 56, 62, 45, 9, 56, 56, 7, 5, 0, 22, 38, 40, 47, 52, 48, 57, 39, 10, 9 }
  { 35, 11, 23, 14, 51, 35, 20, 41, 56, 62, 16, 20, 41, 56, 7, 16, 21, 38, 24, 40, 26, 26, 42, 57, 39 }
  { 33, 34, 51, 51, 52, 41, 41, 34, 62, 0, 41, 41, 56, 7, 5, 56, 38, 38, 40, 44, 37, 42, 57, 39, 10 }
  { 16, 31, 32, 15, 60, 30, 4, 17, 19, 25, 22, 20, 4, 53, 19, 21, 22, 46, 25, 55, 26, 48, 63, 58, 55 }
},
```

It is a requirement of bitstream conformance that the values of $AlfCoeff_L$ [adaptation_parameter_set_id][filtIdx][j] with filtIdx=0 . . . NumAlfFilters−1, j=0 . . . 11 shall be in the range of $-2^7$ to $2^7-1$, inclusive.

alf_luma_clip_idx[sfIdx][j] specifies the clipping index of the clipping value to use before multiplying by the j-th coefficient of the signalled luma filter indicated by sfIdx. It is a requirement of bitstream conformance that the values of alf_luma_clip_idx[sfIdx][j] with sfIdx=0 . . . alf_luma_num_filters_signalled_minus1 and j=0 . . . 11 shall be in the range of 0 to 3, inclusive.

The luma filter clipping values $AlfClip_L$[adaptation_parameter_set_id] with elements $AlfClip_L$[adaptation_parameter_set_id][filtIdx][j], with filtIdx=0 . . . NumAlfFilters−1 and j=0.11 are derived as specified in Table 7-4 depending on bitDepth set equal to $BitDepth_Y$ and clipIdx set equal to alf_luma_clip_idx[alf_luma_coeff_delta_idx[filtIdx] ][j].

alf_chroma_num_alt_filters_minus1 plus 1 specifies the number of alternative filters for chroma components.

alf_chroma_clip_flag[altIdx] equal to 0 specifies that linear adaptive loop filtering is applied on chroma components when using the chroma filter with index altIdx; alf_chroma_clip_flag[altIdx] equal to 1 specifies that non-linear adaptive loop filtering is applied on chroma components when using the chroma filter with index altIdx. When not present, alf_chroma_clip_flag[altIdx] is inferred to be equal to 0.

alf_chroma_coeff_abs[altIdx][j] specifies the absolute value of the j-th chroma filter coefficient for the alternative chroma filter with index altIdx. When alf_chroma_coeff_abs[altIdx][j] is not present, it is inferred to be equal 0. It is a requirement of bitstream conformance that the values of alf_chroma_coeff_abs[altIdx][j] shall be in the range of 0 to $2^7-1$, inclusive.

The order k of the exp-Golomb binarization uek(v) is set equal to 3.

alf_chroma_coeff_sign[altIdx][j] specifies the sign of the j-th chroma filter coefficient for the alternative chroma filter with index altIdx as follows:

If alf_chroma_coeff_sign[altIdx][j] is equal to 0, the corresponding chroma filter coefficient has a positive value.

Otherwise (alf_chroma_coeff_sign[altIdx][j] is equal to 1), the corresponding chroma filter coefficient has a negative value.

When alf_chroma_coeff_sign[altIdx][j] is not present, it is inferred to be equal to 0.

The chroma filter coefficients $AlfCoeff_C$[adaptation_parameter_set_id][altIdx] with elements $AlfCoeff_C$[adaptation_parameter_set_id][altIdx][j], with altIdx=0 . . . alf_chromanum_alt_filtersminus1, j=0 . . . 5 are derived as follows:

$$AlfCoeff_C[\text{adaptation\_parameter\_set\_id}][\text{altIdx}][j]= \text{alf\_chroma\_coeff\_abs}[\text{altIdx}][j] * (1-2*\text{alf\_chroma\_coeff\_sign}[\text{altIdx}][j]) \quad (7\text{-}51)$$

It is a requirement of bitstream conformance that the values of $AlfCoeff_C$[adaptation_parameter_set_id][altIdx][j] with altIdx=0 . . . alf_chroma_num_alt_filters_minus1, j=0 . . . 5 shall be in the range of $-2^7-1$ to $2^7-1$, inclusive.

alf_cross_component_cb_filter_signal_flag equal to 1 specifies that a cross component Cb filter is signalled. alf_cross_component_cb_filter_signal_flag equal to 0 specifies that a cross component Cb filter is not signalled. When ChromaArrayType is equal to 0, alf_cross_component_cb_filter_signal_flag shall be equal to 0.

alf_cross_component_cb_filters_signalled_minus1 plus 1 specifies the number of cross component Cb filters signalled in the current ALF APS. The value of alf_cross_component_cb_filters_signalled_minus1 shall be in the range 0 to 3.

alf_cross_component_cb_coeff_abs_idx[k] [j] specifies the absolute table index value of the j-th coefficient of the signalled k-th cross-component Cb filter set. When alf_cross_component_cb_coeff_abs_idx[k][j] is not present, it is inferred to be equal to 0. It is a requirement of bitstream conformance that the values of alf_cross_component_cb_coeff_abs_idx[k][j] shall be in the range of 0 to 10, inclusive. The maximum value of the tb(v) coded syntax element is 11.

alf_cross_component_cb_coeff_sign[k][j] specifies the sign of the j-th coefficient of the signalled k-th cross-component Cb filter set as follows:

If alf_cross_component_cb_coeff_sign[k][j] is equal to 0, the corresponding cross-component Cb filter coefficient has a positive value.

Otherwise (alf_cross_component_cb_coeff_sign[k][j] is equal to 1), the corresponding cross-component Cb filter coefficient has a negative value.

When alf_cross_component_cb_coeff_sign[k][j] is not present, it is inferred to be equal to 0.

The cross-component Cb filter coefficient CcAlfApsCoeff$_{Cb}$[adaptation parameter set id][k][j] are derived as follows:

$$\text{CcAlfApsCoeff}_{Cb}[\text{adaptation\_parameter\_set\_id}][k][j] = \text{CcAlfApsCoeffMap}[\text{alf\_cross\_component\_cb\_coeff\_abs\_idx}[k][j]]*(1-2*\text{alf\_cross\_component\_cb\_coeff\_sign}[k][j]) \text{ CcAlfApsCoeffMap}=\{0,1,2,3,4,6,8,12,16,24,32\} \quad (7\text{-}51)$$

It is required of bitstream conformance that the value of CcAlfApsCoeffcb[adaptation_parameter_set_id][k][j] with i=0, . . . , 6 shall be in the range of −32 to 32, inclusive.

alf_cross_component_cr_filter_signal_flag equal to 1 specifies that a cross component Cr filter is signalled. alf_cross_component_cr_filter_signal_flag equal to 0 specifies that a cross component Cr filter is not signalled. When ChromaArrayType is equal to 0, alf_cross_component_cr_filtersignalflag shall be equal to 0.

alf_cross_component_cr_filters_signalled_minus1 plus 1 specifies the number of cross component Cr filters signalled in the current ALF APS. The value of alf_cross_component_crfilters_signalled_minus1 shall be in the range 0 to 3.

alf_cross_component_cr_coeff_abs_idx [k][j] specifies the absolute table index value of the j-th coefficient of the signalled k-th cross-component Cr filter set. When alf_cross_component_cr_coeff_absidx[k][j] is not present, it is inferred to be equal to 0. It is a requirement of bitstream conformance that the values of alf_cross_component_cr_coeff_abs_idx[k][j] shall be in the range of 0 to 10, inclusive. The maximum value of the tb(v) coded syntax element is 11.

alf_cross_component_cr_coeff_sign [k][j] specifies the sign of the j-th coefficient of the signalled k-th cross-component Cr filter set as follows:

If alf_cross_component_cr_coeff_sign[k][j] is equal to 0, the corresponding cross-component Cr filter coefficient has a positive value.

Otherwise (alf_cross_component_cr_coeff_sign[k][j] is equal to 1), the corresponding cross-component Cr filter coefficient has a negative value.

When alf_cross_component_cr_coeff_sign[k][j] is not present, it is inferred to be equal to 0.

The cross-component Cr filter coefficient CcAlfApsCoeff$_{CR}$[adaptation_parameter_set_id][k][j] are derived as follows:

$$\text{CcAlfApsCoeff}_{Cr}[\text{adaptation\_parameter\_set\_id}][k][j] = \text{CcAlfApsCoeffMap}[\text{alf\_cross\_component\_cr\_coeff\_abs\_idx}[k][j]]*(1-2*\text{alf\_cross\_component\_cr\_coeff\_sign}[k][j]) \text{CcAlfApsCoeffMap}=\{0,1,2,3,4,6,8,12,16,24,32\} \quad (7\text{-}52)$$

It is required of bitstream conformance that the value of CcAlfApsCoeff$_{Cr}$[adaptation_parameter_set_id][k][j] with i=0, . . . , 6 shall be in the range of −32 to 32, inclusive.

alf_chroma_clip_idx[altIdx][j] specifies the clipping index of the clipping value to use before multiplying by the j-th coefficient of the alternative chroma filter with index altIdx. It is a requirement of bitstream conformance that the values of alf_chroma_clip_idx[altIdx][j] with altIdx=0 . . . alf_chroma_num_alt_filters_minus1, j=0 . . . 5 shall be in the range of 0 to 3, inclusive.

The chroma filter clipping values AlfClip$_C$[adaptation_parameter_set_id][altIdx] with elements AlfClip$_C$[adaptation_parameter_set_id][altIdx][j], with altIdx=0 . . . alf_chroma_num_alt_filters_minus1, j=0 . . . 5 are derived as specified in Table 7-4 depending on bitDepth set equal to BitDepth$_C$ and clipIdx set equal to alf_chroma_clip_idx[altIdx][j].

TABLE 7-4

Specification AlfClip depending on bitDepth and clipIdx

| bitDepth | clipIdx | | | |
| --- | --- | --- | --- | --- |
|  | 0 | 1 | 2 | 3 |
| 8 | 255 | 64 | 16 | 4 |
| 9 | 511 | 108 | 23 | 5 |
| 10 | 1023 | 181 | 32 | 6 |
| 11 | 2047 | 504 | 45 | 7 |
| 12 | 4095 | 512 | 64 | 8 |
| 13 | 8191 | 861 | 91 | 10 |
| 14 | 16383 | 1448 | 128 | 11 |
| 15 | 32767 | 2435 | 181 | 13 |
| 16 | 65535 | 4096 | 256 | 16 |

Cross Component Filtering Process for Block of Chroma Samples

Inputs of this process are:

a reconstructed luma picture sample array recPicture$_L$ prior to the luma adaptive loop filtering process, a filtered reconstructed chroma picture sample array alfPicture$_C$, a chroma location (xCtbC, yCtbC) specifying the top-left sample of the current chroma coding tree block relative to the top left sample of the current picture, a width ccAlfWidth of block of chroma samples a height ccAlfHeight of block of chroma samples cross component filter coefficients CcAlfCoeff[j], with j=0 . . . 6

Output of this process is the modified filtered reconstructed chroma picture sample array ccAlfPicture.

The coding tree block luma location (xCtb, yCtb) is derived as follows:

$$x\text{Ctb}=(((x\text{Ctb}C*\text{SubWidthC})\text{>>Ctb Log 2Size}Y) <<\text{Ctb Log 2Size}Y) \quad (8\text{-}1229)$$

$$y\text{Ctb}=(((y\text{Ctb}C*\text{SubHeight}C)\text{>>Ctb Log 2Size}Y) <<\text{Ctb Log 2Size}Y) \quad (8\text{-}1229)$$

For the derivation of the filtered reconstructed chroma samples ccAlfPicture[xCtbC+x][yCtbC+y], each reconstructed chroma sample inside the current chroma block of samples 1fPictured$_C$ [xCtbC+x][yCtbC+y] with x=0 . . . ccAlfWidth−1, y=0 . . . ccAlfHeight−1, is filtered as follows:

The luma location $(x_L, y_L)$ corresponding to the current chroma sample at chroma location (xCtbC+x, yCtbC+y) is set equal to ((xCtbC+x)*SubWidthC, (yCtbC+y)*SubHeightC)

The luma locations $(h_{xL+i}, v_{yL+j})$ with $i = -1 \ldots 1$, $j = -1 \ldots 2$ inside the array recPicture$_L$ are derived as follows:

If pps_loop_filter_across_virtual_boundaries_disabled_flag is equal to 1, and PpsVirtualBoundariesPosX[n] % CtbSizeY is not equal to 0, and xL−PpsVirtualBoundariesPosX[n] is greater than or equal to 0 and less than 3 for any n=0 ... pps_numver_virtual_boundaries−1, the following applies:

$h_{xL+i}$=Clip3(PpsVirtualBoundariesPosX[n], pic_width_in_luma_samples−1,xL+i)     (8-1229)

Otherwise, if pps_loop_filter_across_virtual_boundaries_disabled_flag is equal to 1, and PpsVirtualBoundariesPosX[n] % CtbSizeY is not equal to 0, and PpsVirtualBoundariesPosX[n]−xL is greater than 0 and less than 4 for any n=0 ... pps_num_ver_virtual_boundaries−1, the following applies:

$h_{x+i}$=Clip3(0,PpsVirtualBoundariesPosX[n]−1,xL+i)     (8-1230)

Otherwise, the following applies:

$h_{x+i}$=Clip3(0,pic_width_in_luma_samples−1,xL+i)     (8-1231)

If pps_loop_filter_across_virtual_boundaries_disabled_flag is equal to 1, and PpsVirtualBoundariesPosY[n] % CtbSizeY is not equal to 0, and yL−PpsVirtualBoundariesPosY[n] is greater than or equal to 0 and less than 3 for any n=0 ... pps_numhor_virtual_boundaries−1, the following applies:

$v_{y+j}$=Clip3(PpsVirtualBoundariesPosY[n],pic_height_in_luma_samples−1,yL+j)     (8-1232)

Otherwise, if pps_loop_filter_across_virtual_boundaries_disabled_flag is equal to 1, and PpsVirtualBoundariesPosY[n] % CtbSizeY is not equal to 0, and PpsVirtualBoundariesPosY[n]−yL is greater than 0 and less than 4 for any n=0 ... pps_num_hor_virtual_boundaries−1, the following applies:

$v_{y+j}$=Clip3(0,PpsVirtualBoundariesPosY[n]−1,yL+j)     (8-1233)

Otherwise, the following applies:

$v_{y+j}$=Clip3(0,pic_height_in_luma_samples−1,yL+j)     (8-1234)

The variables clipLeftPos, clipRightPos, clipTopPos and clipBottomPos are derived by invoking the ALF boundary position derivation process as specified in clause 8.8.5.5 with (xCtb, yCtb) and $(x_L-xCtb, y_L-yCtb)$ as inputs.

The vertical sample position offsets yM1, yP1 and yP2 are specified in Table x—according to the vertical luma sample position $y_L$, clipLeftPos and clipRightPos.

The horizontal sample position offsets xM1 and xP1 are specified in Table y-yyyy according to the horizontal luma sample position xL, clipLeftPos and clipRightPos.

The variable curr is derived as follows:

curr=alfPicturec[xCtbC+x,yCtbC+y]     (8-1286)

The array of cross component filter coefficients f[j] is derived as follows with j=0 ... 6:

f[j]=CcAlfCoeff[j]     (8-1287)

The variable sum is derived as follows:

sum=f[0]*(recPicture$_L$[$h_x,v_{y+M1}$]−recPicture$_L$[$h_x,v_y$])+f[1]*(recPicture$_L$[$h_{x+xM1},v_y$]−recPicture$_L$[$h_x,v_y$])+f[2]*(recPicture$_L$[$h_{x+xP1},v_y$]−recPicture$_L$[$h_x,v_y$])+f[3]*(recPicture$_L$[$h_{x+xM1},v_{y+yP1}$]−recPicture$_L$[$h_x,v_y$])+f[4]*(recPicture$_L$[$h_x,v_{y+P1}$]−recPicture$_L$[$h_x,v_y$])+f[5]*(recPicture$_L$[$h_{x+xP1},v_{y+yP1}$]−recPicture$_L$[$h_x,v_y$])+f[6]*(recPicture$_L$[$h_x,v_{y+yP2}$]−recPicture$_L$[$h_x,v_y$])

sum=Clip3(−(1<<(BitDepth$_C$−1)),(1<<(BitDepth$_C$−1))−1, sum)     (8-1290)

sum=curr+(sum+64)>>(7+(BitDepth$_Y$-BitDepth$_C$))     (8-1290)

The modified filtered reconstructed chroma picture sample array ccAlfPicture [xCtbC+x][yCtbC+y] is derived as follows:

ccAlfPicture[xCtbC+x][yCtbC+y]=Clip3(0,(1<<BitDepth$_C$)−1,sum)     (8-1291)

TABLE x-xx

Specification of yM1, yP1 and yP2 according to the vertical luma sample position yL, clipTopPos and clipBottomPos

| Condition | yM1 | yP1 | yP2 |
|---|---|---|---|
| yL = = clipTopPos + 1 | −1 | 1 | 1 |
| yL = = clipTopPos | 0 | 0 | 1 |
| yL = = clipBottomPos − 1 | 0 | 0 | 1 |
| yL = = clipBottomPos − 2 | −1 | 1 | 1 |
| Otherwise | −1 | 1 | 2 |

TABLE y-yy

Specification of xM1 and xP1 according to the horizontal luma sample position xL, clipLeftPos and clipRightPos

| Condition | xM1 | xP1 |
|---|---|---|
| xL = = clipLeftPos | 0 | 0 |
| xL = = clipRightPos − 1 | 0 | 0 |
| xL = = clipRightPos − 2 | −1 | 1 |
| Otherwise | −1 | 1 |

9.3 Parsing Process for Truncated Binary Codes

This process is invoked when the descriptor of a syntax element in the syntax tables in subclause 7.3 is equal to tb(v).

Inputs to this process are bits from the RBSP and the maximum value maxVal.

Outputs of this process are syntax element values.

Syntax elements coded as tb(v) are truncated binary coded. The range of possible values for the syntax element is determined first. The range of this syntax element is 0 to maxVal, inclusive, with maxVal being greater than or equal to 1. synVal which is equal to the value of the syntax element is given by a process specified as follows:

```
thVal = 1
th = −1
while( thVal <= maxVal ) {
    th++
    thVal <<= 1
}
val = 1 << th   (9-3)
b = maxVal − val
synVal = read_bits( th )
if( synVal >= val − b ) {
    synVal <<= 1
    synVal += read_bits( 1 )
    synVal −= val − b
}
``` where the value returned from read bits(th) is interpreted as a binary representation of an unsigned integer with most significant bit written first.

End changes

The invention claimed is:

1. A method for encoding or decoding an image, the method comprising:
   obtaining a first luma sample value, L1, associated with the image;
   obtaining a second luma sample value, L2, associated with the image;
   obtaining a first luma delta value, $\Delta L1$, wherein $\Delta L1 = L2 - L1$;
   obtaining a first coefficient value, C1, from a set of predefined integers ($Z_{sub}$), wherein $Z_{sub}$ comprises:
      a first subset of integers ($Z_{two}$), wherein each integer in $Z_{two}$ is a power of two or $-1$ times a power of two or zero; and
      a second subset of integers ($Z_{ext}$) comprising a first integer that is equal to $\alpha 2^n + \beta 2^p$, where $\alpha = \pm 1$, $\beta = \pm 1$, n is an integer greater than or equal to 0, p is an integer greater than or equal to 0, and $p \neq n$, and further wherein $Z_{ext}$ does not include any positive integer that is not equal to a sum of two different powers of two;
   obtaining a first product, P1, using $\Delta L1$ and C1, wherein $P1 = (C1)(\Delta L1)$;
   calculating a first residual correction value, $\Delta I1$ using P1 and a set of other products; and
   filtering an unfiltered chroma value, $R_C$, associated with the image using the first residual correction value, $\Delta I1$, thereby producing a filtered chroma value $R_C^F$ associated with the image.

2. The method of claim 1, wherein filtering the unfiltered chroma value to produce the filtered chroma value consists of calculating: $R_C^F = \Delta I1 + R_C$.

3. The method of claim 1, wherein
   the set of other products comprises a second product, P2, $$P2 = (C2)(\Delta L2),$$

C2 is a second coefficient value,
   $\Delta L2$ is a second luma delta value that is equal to L3 − L1, and
   L3 is a third luma sample value associated with the image.

4. The method of claim 1, wherein
   L1 has a first position within a two-dimensional block of luma sample values associated with the image, wherein the coordinates of the first position are x1,y1,
   L2 has a second position within the two-dimensional block of luma sample values, wherein the coordinates of the second position are x2,y2,
   the absolute value of (x1-x2) is less than or equal to 4, and the absolute value of (y1-y2) is less than or equal to 4.

5. The method of claim 4, wherein
   the absolute value of (x1-x2) is less than or equal to 1, and the absolute value of (y1-y2) is less than or equal to 2.

6. The method of claim 1, wherein
   $R_C$ has a position within a two-dimensional block of chroma sample values associated with the image, where the coordinates of the position are xc,yc,
   L1 has a first position within a two-dimensional block of luma sample values associated with the image, wherein the coordinates of the first position are x1,y1,
   L2 has a second position within the two-dimensional block of luma sample values, wherein the coordinates of the second position are x2,y2, and
   the second position is obtained from the position of $R_C$ within the two-dimensional block of chroma sample values.

7. The method of claim 6, wherein $$x2 = (Wc)(xc),$$

$$y2 = (Hc)(yc),$$

Wc is a first predetermined coefficient that is based on the format of the image, and
   Hc is a second predetermined coefficient that is based on the format of the image.

8. The method of claim 7, wherein
   when the format of the image is 4:2:0, Wc=Hc=2;
   when the format of the image is 4:2:2, Wc=2 and Hc=1; and
   when the format of the image is 4:4:4, Wc=Hc=1.

9. A non-transitory computer readable medium storing a computer program comprising instructions which when executed by processing circuitry causes the processing circuitry to perform the method of claim 1.

10. An apparatus, the apparatus comprising:
    processing circuitry; and
    a memory, said memory containing instructions executable by said processing circuitry, wherein said apparatus is operative to perform a method comprising:
    obtaining a first luma sample value, L1, associated with the image;
    obtaining a second luma sample value, L2, associated with the image;
    obtaining a first luma delta value, $\Delta L1$, wherein $\Delta L1 = L2 - L1$;
    obtaining a first coefficient value, C1, from a set of predefined integers ($Z_{sub}$), wherein $Z_{sub}$ comprises:
       a first subset of integers ($Z_{two}$), wherein each integer in $Z_{two}$ is a power of two or $-1$ times a power of two or zero; and
       a second subset of integers ($Z_{ext}$) comprising a first integer that is equal to $\alpha 2^n + \beta 2^p$, where $\alpha = \pm 1$, $\beta = \pm 1$, n is an integer greater than or equal to 0, p is an integer greater than or equal to 0, and $p \neq n$, and further wherein $Z_{ext}$ does not include any positive integer that is not equal to a sum of two different powers of two;
    obtaining a first product, P1, using $\Delta L1$ and C1, wherein $P1 = (C1)(\Delta L1)$;
    calculating a first residual correction value, $\Delta I1$, using P1 and a set of other products; and
    filtering an unfiltered chroma value, $R_C$, associated with the image using the first residual correction value, $\Delta I1$ thereby producing a filtered chroma value $R_C^F$ associated with the image.

11. The apparatus of claim 10, wherein filtering the unfiltered chroma value to produce the filtered chroma value consists of calculating: $R_C^F = \Delta I1 + R_C$.

12. The apparatus of claim 10, wherein
    the set of other products comprises a second product, P2, $$P2 = (C2)(\Delta L2),$$

C2 is a second coefficient value,
    $\Delta L2$ is a second luma delta value that is equal to L3 − L1, and
    L3 is a third luma sample value associated with the image.

13. The apparatus of claim 10, wherein
    L1 has a first position within a two-dimensional block of luma sample values associated with the image, wherein the coordinates of the first position are x1,y1,
    L2 has a second position within the two-dimensional block of luma sample values, wherein the coordinates of the second position are x2,y2,
    the absolute value of (x1-x2) is less than or equal to 4, and the absolute value of (y1-y2) is less than or equal to 4.

14. The apparatus of claim 13, wherein
the absolute value of (x1-x2) is less than or equal to 1, and
the absolute value of (y1-y2) is less than or equal to 2.

15. The apparatus of claim 10, wherein
$R_C$ has a position within a two-dimensional block of chroma sample values associated with the image, where the coordinates of the position are xc,yc,
L1 has a first position within a two-dimensional block of luma sample values associated with the image, wherein the coordinates of the first position are x1,y1,
L2 has a second position within the two-dimensional block of luma sample values, wherein the coordinates of the second position are x2,y2, and
the second position is obtained from the position of $R_C$ within the two-dimensional block of chroma sample values.

16. The apparatus of claim 15, wherein $x2=(Wc)(xc),$ $y2=(Hc)(yc),$

Wc is a first predetermined coefficient that is based on the format of the image, and
Hc is a second predetermined coefficient that is based on the format of the image.

17. The apparatus of claim 15, wherein
when the format of the image is 4:2:0, Wc=Hc=2;
when the format of the image is 4:2:2, Wc=2 and Hc=1; and
when the format of the image is 4:4:4, Wc=Hc=1.

18. The method of claim 1, wherein
every positive integer within $Z_{ext}$ can be expressed in the form of either $3 \times 2^m$ or $5 \times 2^m$, where m is an integer greater than or equal to 0, and
every negative integer within $Z_{ext}$ can be expressed in the form of either $-3 \times 2^m$ or $-5 \times 2^m$.

19. The method of claim 1, wherein every integer in $Z_{sub}$ is greater than −x and less than x.

20. The method of claim 19, wherein x=129.

\* \* \* \* \*